United States Patent
Cho et al.

(10) Patent No.: US 9,813,978 B2
(45) Date of Patent: Nov. 7, 2017

(54) METHOD AND APPARATUS FOR ESTABLISHING SESSION IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/772,857

(22) PCT Filed: Mar. 7, 2014

(86) PCT No.: PCT/KR2014/001887
§ 371 (c)(1),
(2) Date: Sep. 4, 2015

(87) PCT Pub. No.: WO2014/137184
PCT Pub. Date: Sep. 12, 2014

(65) Prior Publication Data
US 2016/0014686 A1     Jan. 14, 2016

Related U.S. Application Data

(60) Provisional application No. 61/774,584, filed on Mar. 8, 2013, provisional application No. 61/821,731, filed on May 10, 2013.

(51) Int. Cl.
*H04W 28/02*     (2009.01)
*H04W 48/18*     (2009.01)
(Continued)

(52) U.S. Cl.
CPC ....... *H04W 48/18* (2013.01); *H04W 28/0231* (2013.01); *H04W 28/0268* (2013.01);
(Continued)

(58) Field of Classification Search
CPC ......... H04W 28/0231; H04W 28/0268; H04W 28/08; H04W 36/14; H04W 36/22;
(Continued)

(56) References Cited

U.S. PATENT DOCUMENTS

| | | | |
|---|---|---|---|
| 8,923,863 B2 * | 12/2014 | Bhaskaran | H04W 60/00 455/127.4 |
| 9,445,321 B2 * | 9/2016 | Zhu | H04W 60/04 |

(Continued)

FOREIGN PATENT DOCUMENTS

| | | |
|---|---|---|
| KR | 10-2011-0058907 A | 6/2011 |
| WO | 2010/034009 A1 | 3/2010 |

(Continued)

*Primary Examiner* — Mohamed Kamara
(74) *Attorney, Agent, or Firm* — Dentons US LLP

(57) ABSTRACT

A method and apparatus for establishing a session in a wireless communication system is provided. According to the present invention, a session of a 3rd generation partnership project (3GPP) long-term evolution (LTE) system or a session of a Wi-Fi system can be established for user plane (U-plane) switch in a converged system of the 3GPP LTE system and the Wi-Fi system. After performing U-plane switch, an entity of the LTE system may suspend (deactivate) and release radio bearers mapped to all of evolved packet system (EPS) bearer related to U-plane.

14 Claims, 18 Drawing Sheets

(51) Int. Cl.
  *H04W 76/02* (2009.01)
  *H04W 88/06* (2009.01)
  *H04W 36/14* (2009.01)
  *H04W 36/22* (2009.01)
  *H04W 28/08* (2009.01)

(52) U.S. Cl.
  CPC ............ *H04W 28/08* (2013.01); *H04W 36/14* (2013.01); *H04W 36/22* (2013.01); *H04W 76/022* (2013.01); *H04W 76/023* (2013.01); *H04W 76/026* (2013.01); *H04W 88/06* (2013.01)

(58) Field of Classification Search
  CPC . H04W 48/18; H04W 76/022; H04W 76/023; H04W 76/026; H04W 88/06
  See application file for complete search history.

(56) References Cited

U.S. PATENT DOCUMENTS

| | | | |
|---|---|---|---|
| 2008/0198861 A1* | 8/2008 | Makela | H04W 12/06 370/401 |
| 2012/0063414 A1 | 3/2012 | Ramachandran | |
| 2013/0003648 A1 | 1/2013 | Hahn et al. | |
| 2013/0028172 A1* | 1/2013 | Lim | H04W 36/12 370/315 |

FOREIGN PATENT DOCUMENTS

| | | |
|---|---|---|
| WO | 2012/157884 A2 | 11/2012 |
| WO | 2013/025077 A2 | 2/2013 |

* cited by examiner

Fig. 4

| Frame control | Persistent /ID | Address 1 | Address 2 | Address 3 | Sequence control | Address 4 | Sequence control | QoS control | HT control | Frame body | FCS |

METHOD AND APPARATUS FOR ESTABLISHING SESSION IN WIRELESS COMMUNICATION SYSTEM

This application is a National Stage Entry of International Application No. PCT/KR2014/001887, filed Mar. 7, 2014, and claims the benefit of priority to U.S. Provisional Application No. 61/821,731, filed May 10, 2013 and U.S. Provisional Application No. 61/774,584, filed Mar. 8, 2013, all of which are incorporated by reference in their entirety for all purposes as if fully set forth herein.

TECHNICAL FIELD

The present invention relates to wireless communications, and more specifically, to a method and apparatus for establishing a session in a wireless communication system.

BACKGROUND ART

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In general, in an interworking system of the cellular system and the WLAN system, data flows transmitted/received through a secondary RAT system (e.g., Wi-Fi system) as well as data flows transmitted/received through a primary RAT system (e.g., cellular system) may be controlled by a device operating as a local mobility anchor (LMA). When user plane (U-plane) switch is needed, a method for establishing a session for U-plane switch may be required.

SUMMARY OF INVENTION

Technical Problem

The present invention provides a method and apparatus for establishing a session in a wireless communication system. The present invention provides a method for establishing a session of a Wi-Fi system for user plane (U-plane) switch in a converged communication system of a cellular system and a Wi-Fi system. The present invention provides a method for establishing a session of a cellular system for U-plane switch in a converged communication system of a cellular system and a Wi-Fi system.

Solution to Problem

In an aspect, a method for establishing, by an entity of a primary radio access technology (RAT) system, a session in a wireless communication system is provided. The method includes determining a routing type, which is one of user plane (U-plane) aggregation, U-plane segregation and U-plane switch, and a routing rule according to the routing type, based on quality of service (QoS) for a bearer and measurement results on the primary RAT system and a secondary RAT system, if the routing type is the U-plane switch, releasing radio bearers mapped to all of evolved packet system (EPS) bearer related to U-plane, and after all uplink (UL) data is transmitted to a packet data network (PDN) gateway (P-GW), releasing E-UTRAN radio access bearers (E-RABs) mapped to a corresponding EPS bearer.

The QoS may include at least one of a quality class identifier (QCI), an allocation and retention priority (ARP), bit rate of traffic per bearer, and bit rates of traffic per group of bearers.

If the routing type is the U-plane switch, the routing rule may indicate a switch RAT system.

The switch RAT system may be the secondary RAT system.

The routing type may be determined as the U-plane switch when load situation of the primary RAT system is bad whereas load situation of the secondary RAT system is good, and when all of bearers of the corresponding multi-RAT device have non-real time characteristic.

The method may further include transmitting a routing control request message, which includes the routing type which is the U-plane switch and the routing rule which is a switch RAT system, to the P-GW.

The method may further include receiving a routing control response message, which includes a result for the routing control request message, the routing type which is the U-plane switch and the routing rule which is the switch RAT system, from the P-GW as a response to the routing control request message.

The method may further include upon receiving the routing control response message, transmitting a routing control command message, which includes the routing type which is the U-plane switch, the routing rule which is the switch RAT system, and security information, to the multi-RAT device, The primary RAT system may be a 3rd generation partnership project (3GPP) long-term evolution (LTE) system, and the secondary RAT system may be an institute of electrical and electronics engineers (IEEE) 802.11 system.

The entity of the primary RAT system may be one of an eNodeB (eNB), a mobility management entity (MME), or a new entity.

In another aspect, a method for releasing, by a general device, a session in a wireless communication system is provided. The method includes receiving a routing control command message, which includes a routing type which is user plane (U-plane) switch, the routing rule which is a switch radio access technology (RAT) system, and security information, from an entity of a primary RAT system, and releasing radio bearers mapped to all of evolved packet system (EPS) bearer related to U-plane.

The method may further include stopping uplink (UL) data transmission upon receiving the routing control command message.

The method may further include stopping UL data transmission upon releasing the radio bearers.

The method may further include resuming downlink (DL) data transmission through a session of a secondary RAT system before releasing the radio bearers.

The method may further include resuming UL data transmission through a session of a secondary RAT system upon releasing the radio bearers.

Advantageous Effects of Invention

A session can be established effectively for U-plane switch.

BRIEF DESCRIPTION OF DRAWINGS

FIG. 4 shows an example of a frame structure of IEEE 802.11.

MODE FOR THE INVENTION

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
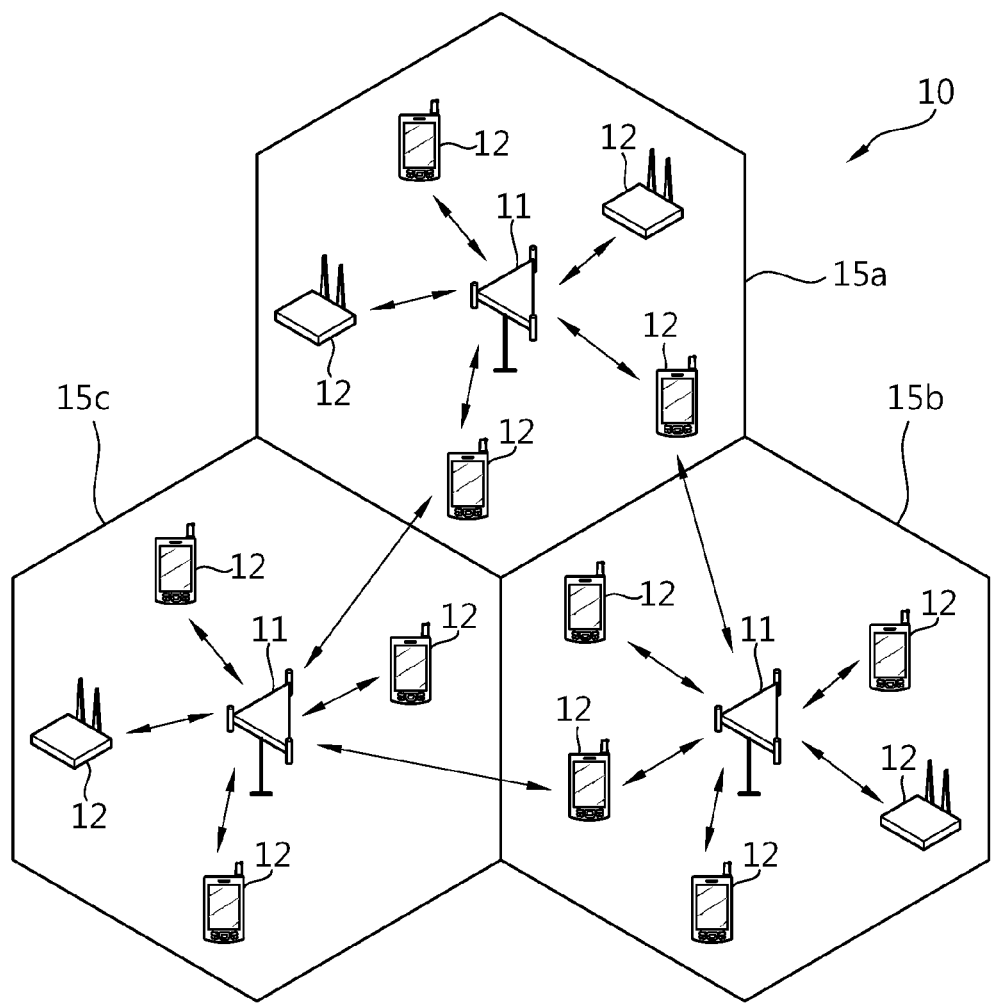
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
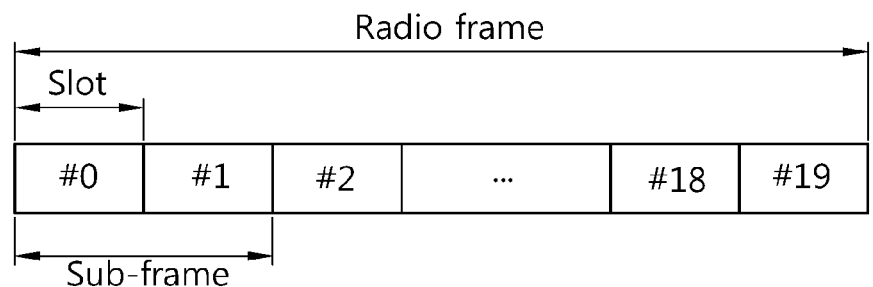
FIG. 2 shows an example of a radio frame structure of 3GPP LTE.

FIG. 2 shows an example of a radio frame structure of 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
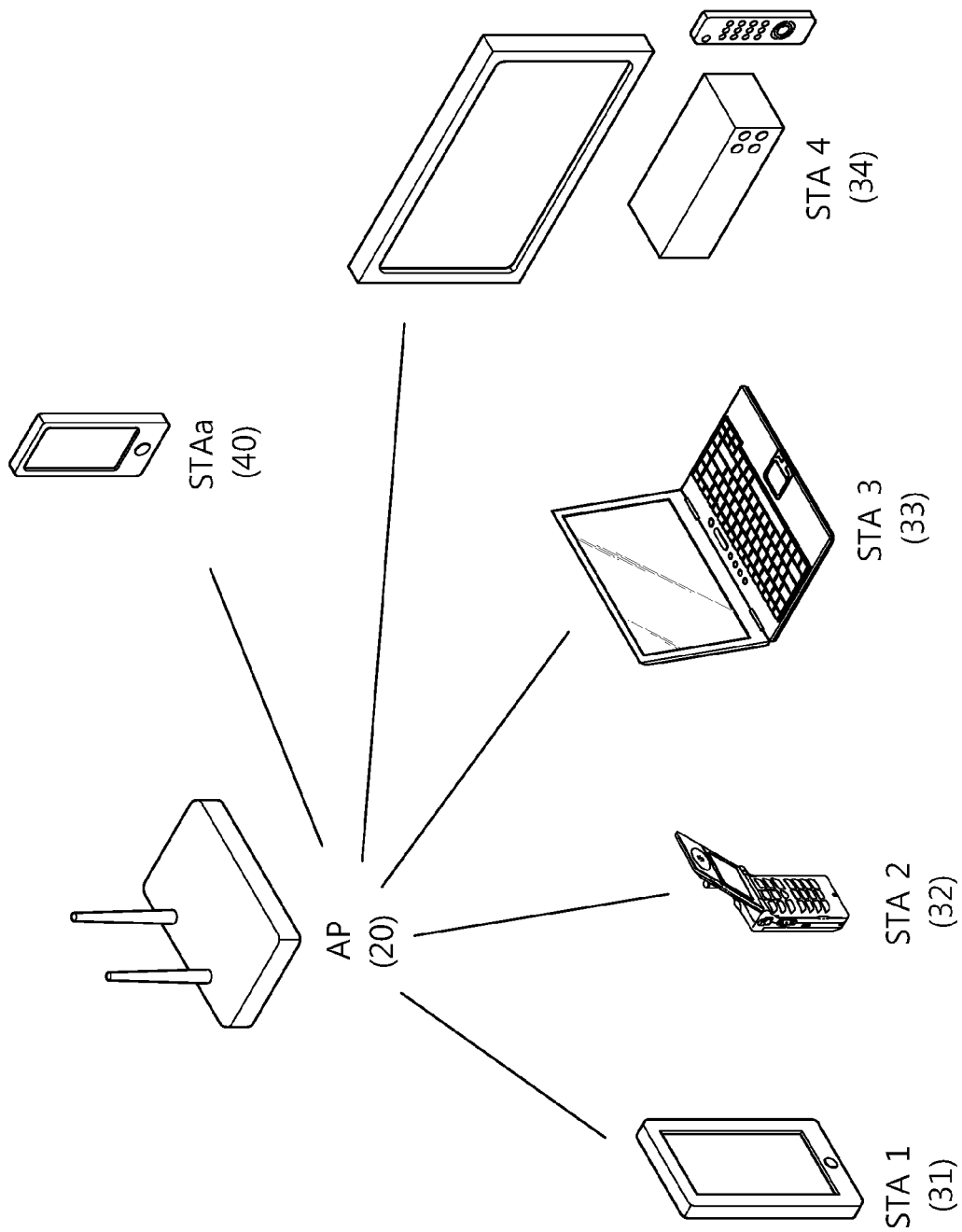
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|         | Authentication | Association |
|---------|----------------|-------------|
| State 1 | X              | X           |
| State 2 | O              | X           |
| State 3 | O              | O           |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
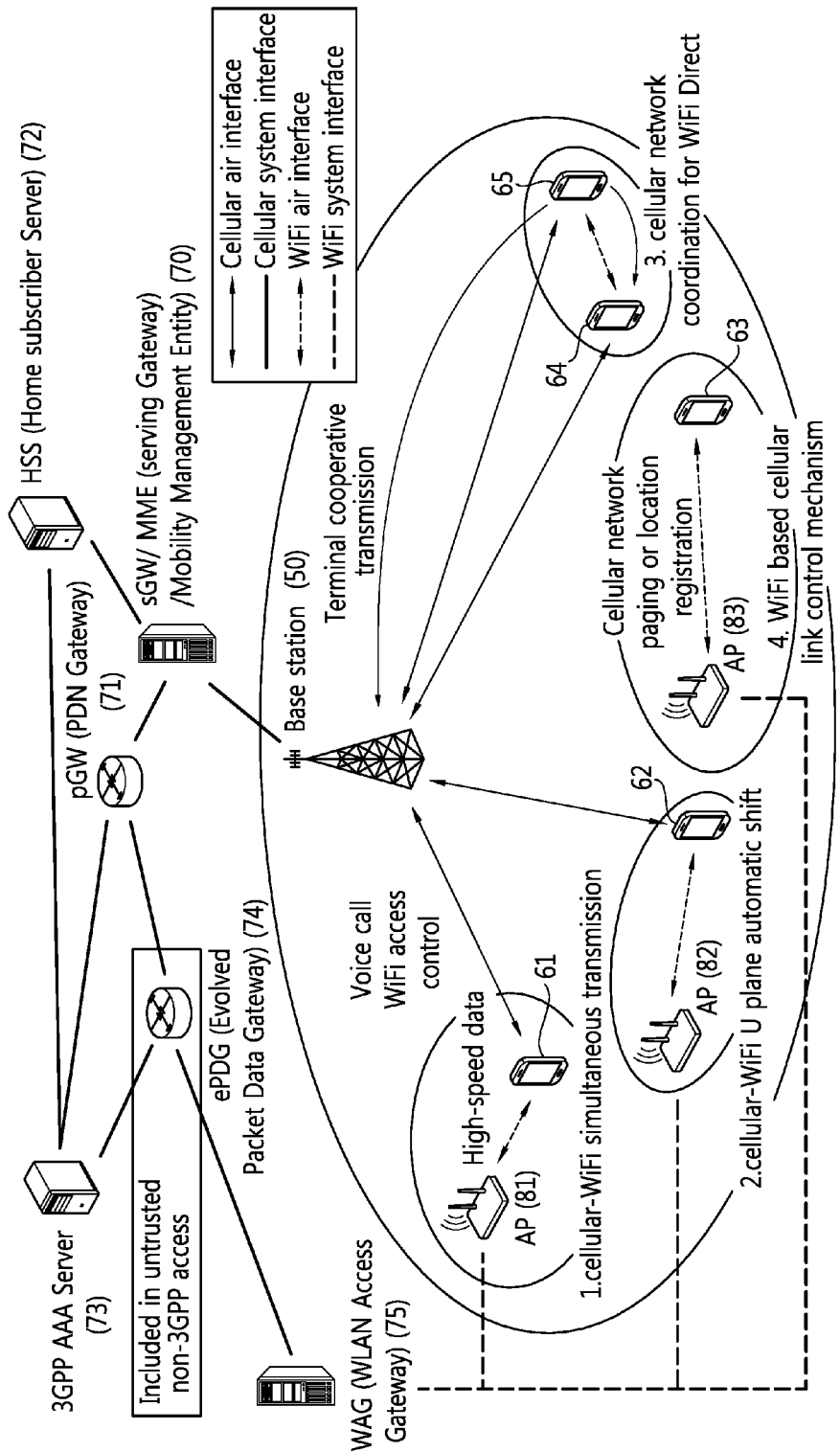
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (ePDG) 74 through the cellular system interface. The ePDG 74 may be included only in un-trusted non-3GPP access. The ePDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

In general, in an interworking system of the cellular system and the WLAN system, data flows transmitted/received through a secondary RAT system (e.g., Wi-Fi system) as well as data flows transmitted/received through a primary RAT system (e.g., LTE system) may be controlled by a device operating as a local mobility anchor (LMA). For example, referring to FIG. 5, data to be transmitted through a cellular system and data to be transmitted through a Wi-Fi system always go through the P-GW. That is, in FIG. 5, a device serving as an LMA may be the P-GW. In this regard, a term "LMA" used in a proxy mobile Internet protocol (PMIP) protocol may be called a different term in another protocol, such as home agent (HA).

Meanwhile, in the interworking system of the cellular system and the WLAN system, data flows may be transmitted through the most appropriate RAT system among a plurality of RAT systems. This may be referred to as U-plane switch. According to U-plane switch, data flows transmitted through the cellular system may be switched to the WLAN system. Alternatively, data flows transmitted through the WLAN system may be switched to the cellular system. In a scenario of U-plane switch, a method for establishing, which is controlled by a network, a session may be required to support seamless connectivity for all data flows of a corresponding device.

Figure 6:
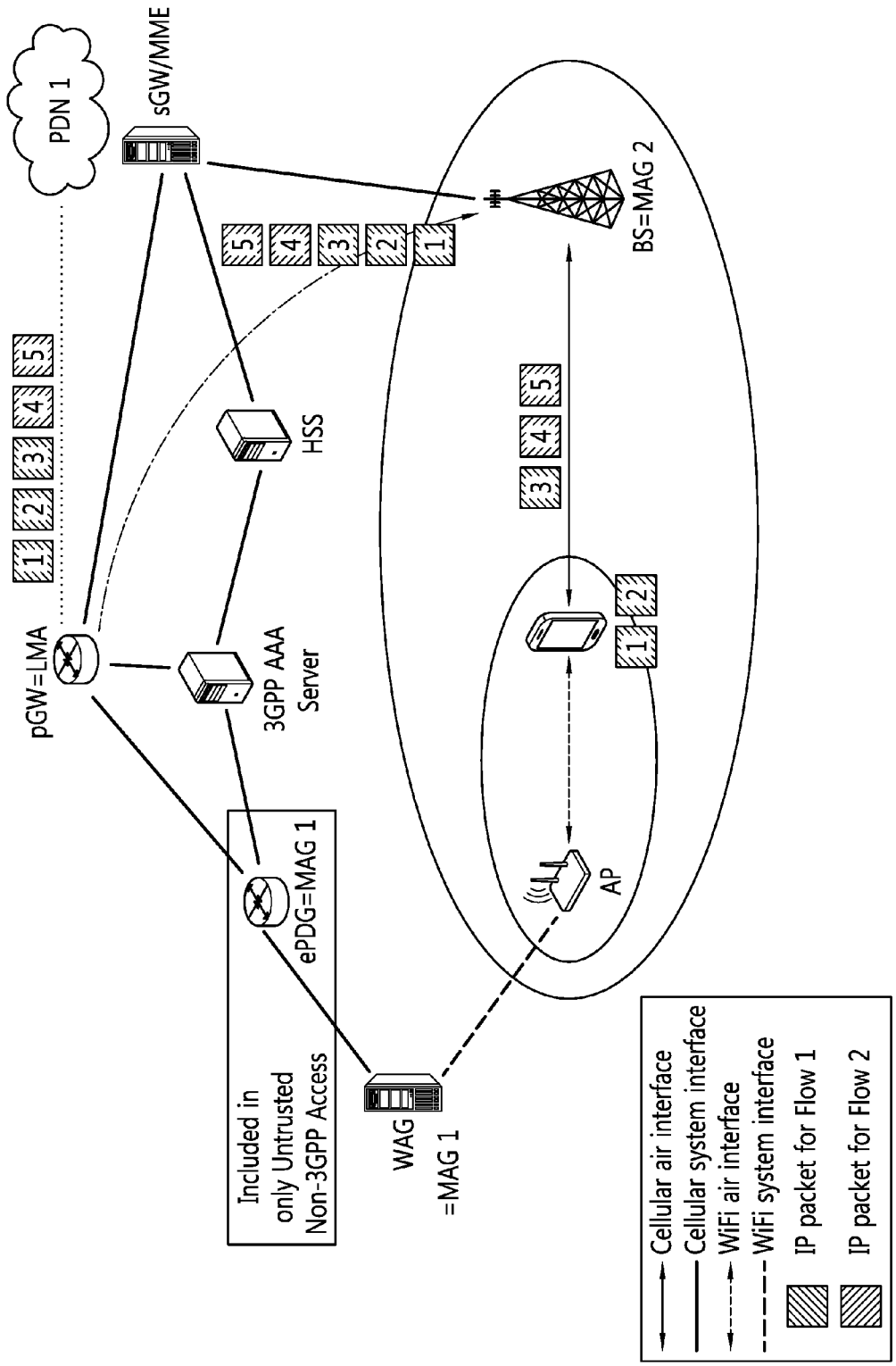
FIG. 6 and FIG. 7 show an example of U-plane switch from a cellular system to a Wi-Fi system.
Figure 7:
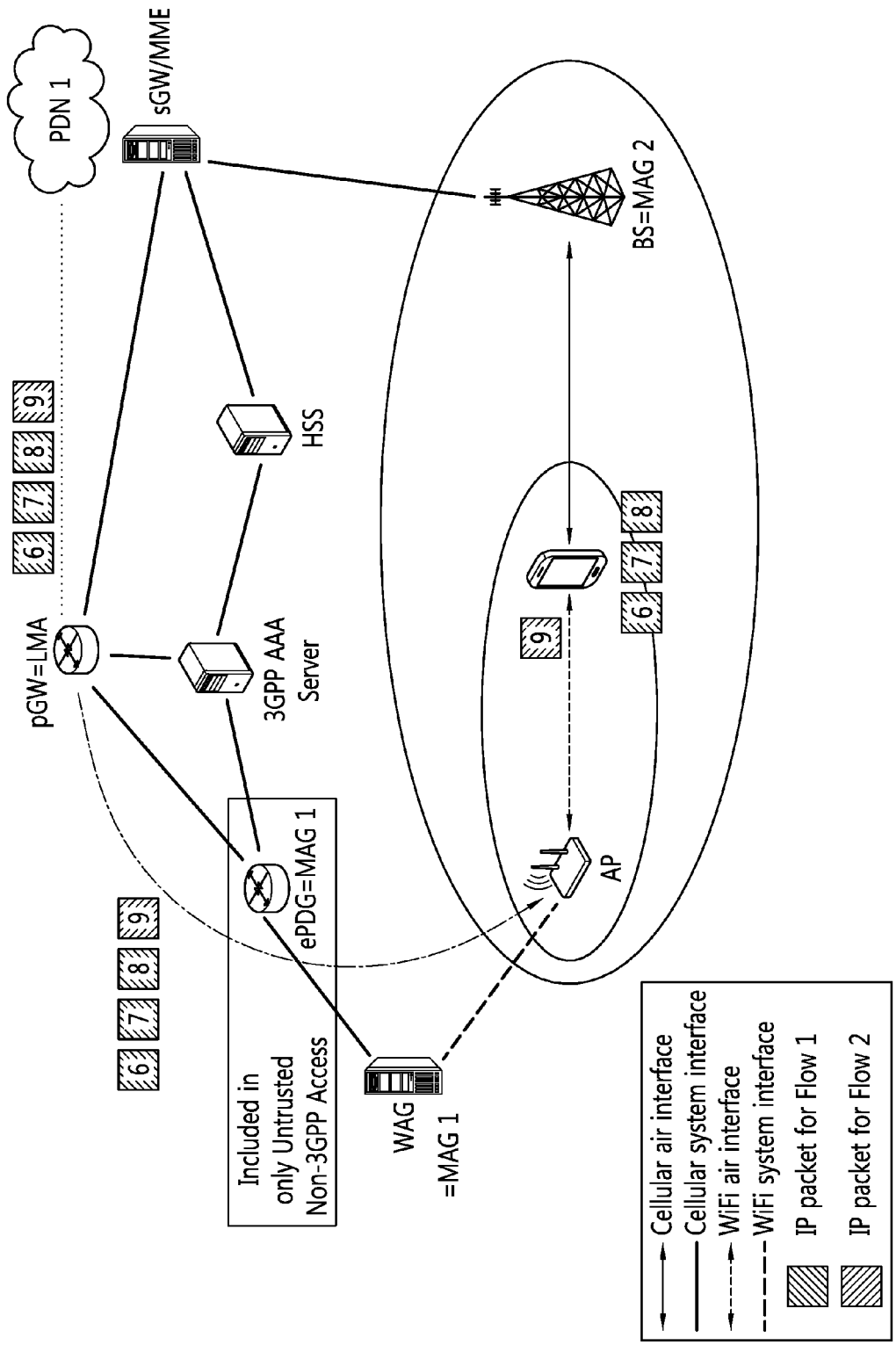

FIG. 6 and FIG. 7 show an example of U-plane switch from a cellular system to a Wi-Fi system. FIG. 6 shows IP flow mobility in the converged communication system at time T, and FIG. 7 shows IP flow mobility in the converged communication system at time T+α.

Referring to FIG. 6, IP packets for flow 1 include IP packets 1, 2, and 3, and IP packets for flow 2 include IP packets 4 and 5. The P-GW is connected to a PDN 1, and operates as an LMA. At time T, all IP packets for flow 1 and flow 2 are transmitted to the UE through the cellular system by going through a BS. In this case, the BS may be operated as a mobile access gateway (MAG) in the cellular system.

Referring to FIG. 7, IP packets for flow 1 include IP packets 6, 7 and 8, and IP packets for flow 2 include IP packet 9. At time T+α, U-plane switch from the cellular system to the Wi-Fi system may occur. Accordingly, all IP packets for flow 1 and flow 2 are transmitted to the UE through the Wi-Fi system by going through a WAG or ePDG. In this case, the WAG or ePDG may be operated as a MAG in the Wi-Fi system.

Figure 8:
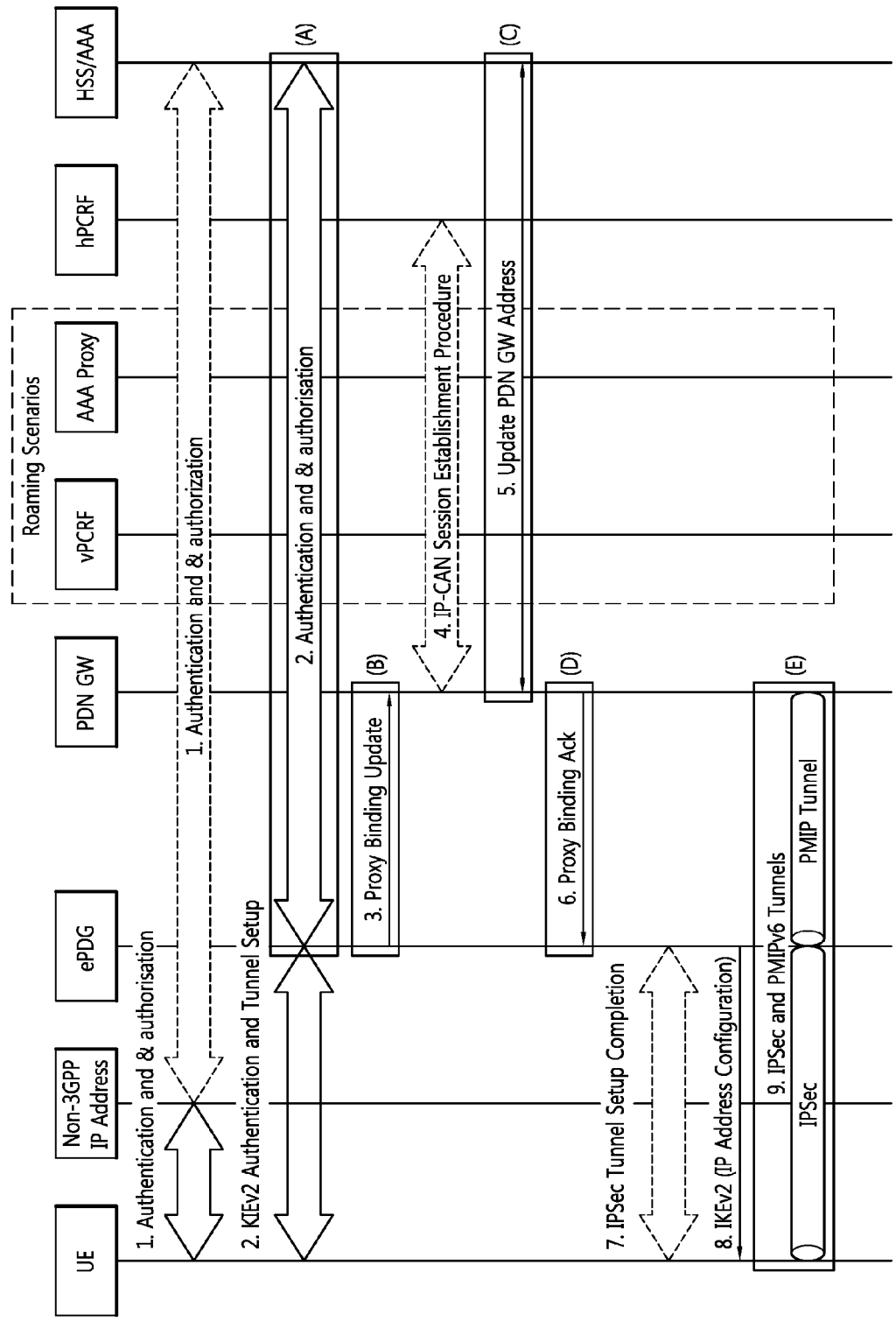
FIG. 8 shows an initial attachment procedure over PMIP based S2b for roaming, non-roaming and LBO.

FIG. 8 shows an initial attachment procedure over PMIP based S2b for roaming, non-roaming and LBO. It may be referred to Section 7.2.1 of 3GPP TS 23.402 V11.5.0 (2012-December).

This clause is related to the case when the UE powers-on in an un-trusted non-3GPP IP access network via the PMIP based S2b interface.

PMIPv6 specification is used to setup a PMIPv6 tunnel between the ePDG and the P-GW. It is assumed that MAG is collocated with ePDG. The IPsec tunnel between the UE and the ePDG provides a virtual point-to-point link between the UE and the MAG functionality on the ePDG.

This procedure is also used to establish the first PDN connection over an un-trusted non-3GPP access with PMIPv6 on S2b when the UE already has active PDN connections only over a 3GPP access and wishes to establish simultaneous PDN connections to different APNs over multiple accesses.

The UE may be authenticated and authorized to access the un-trusted non-3GPP access network with an access network specific procedure.

1) The access authentication procedure between UE and the 3GPP EPC may be performed. In the roaming case signalling may be routed via a 3GPP AAA proxy in the VPLMN. As part of the AAA exchange for network access authentication, the AAA/HSS and/or the 3GPP AAA proxy may return to the non-3GPP IP access a set of home/visited operator's policies to be enforced on the usage of local IP address, or IPv6 prefix, allocated by the access system upon successful authentication. Subscription data is provided to the non-3GPP IP access by the HSS/AAA in this step.

2) The IKEv2 tunnel establishment procedure is started by the UE. The UE may indicate in a notification part of the IKEv2 authentication request that it supports MOBIKE. The ePDG IP address to which the UE needs to form IPsec tunnel is discovered via DNS query. The UE may request connectivity to a specific PDN providing an APN that is conveyed with IKEv2. For networks supporting multiple mobility protocols, if there was any dynamic IPMS decision involved in this step, the decision is stored in the 3GPP AAA server. The P-GW information is returned as part of the reply from the 3GPP AAA server to the ePDG. If the UE has provided an APN the ePDG verifies that it is allowed by subscription. If the UE has not provided an APN the ePDG uses the default APN. The P-GW selection takes place at this point. This may entail an additional name resolution step, issuing a request to a DNS server. If there is no requested IP address in the CFG_Request from the UE to the ePDG which indicates the attach is an initial attach, the ePDG may perform a new P-GW selection procedure, e.g., to allocate a P-GW that allows for more efficient routing. The UE shall indicate the type of address(es) (IPv4 address or IPv6 prefix/address or both) in the CFG_Request sent to the ePDG during IKEv2 message exchange. If the PDN requires an additional authentication and authorisation with an external AAA server, the UE includes the authentication credentials in this step.

3) The ePDG sends the proxy binding update (MN-NAI, Lifetime, APN, Access Technology Type, Handover Indicator, GRE key for downlink traffic, UE Address Info, Charging Characteristics, Additional Parameters) message to the P-GW. Access Technology Type option is set to a value matching the characteristics of the non-3GPP IP access. Handover Indicator is set to indicate attachment over a new interface. The proxy binding update message shall be secured. The MN NAI identifies the UE. The Lifetime field must be set to a nonzero value in the case of a registration and a zero value in the case of deregistration. The APN is used by the P-GW to determine which PDN to establish connectivity for, in the case that the P-GW supports multiple PDN connectivity. The ePDG creates and includes a PDN connection identity if the ePDG supports multiple PDN connections to a single APN. The UE Address Info shall be set based on the CFG_Request in step 1 and subscription profile in the same way as the PDN type is selected during the EUTRAN initial attach. The Additional Parameters include the authentication credentials for an additional authentication and authorization with an external AAA server if it was provided by the UE in step 2. The P-GW performs the authentication and authorization with the external AAA server if it is required to get access for the given APN.

4) The P-GW initiates the IP CAN session establishment procedure with the PCRF.

5) The selected P-GW informs the 3GPP AAA server of the P-GW identity. The 3GPP AAA Server then informs the HSS of the P-GW identity and APN associated with the UE's PDN connection. The message includes information that identifies the PLMN in which the P-GW is located. This information is registered in the HSS.

6) The P-GW processes the proxy binding update and creates a binding cache entry for the UE. The P-GW allocates an IP address for the UE. The P-GW then sends a proxy binding ack (MN NAI, UE Address Info, GRE Key for uplink traffic, Charging ID) message to the ePDG, including the IP address(es) allocated for the UE (identified by the MN NAI). If the corresponding proxy binding update contains the PDN connection identity, the P-GW shall acknowledge if multiple PDN connections to the given APN are supported. The Charging ID is assigned for the PDN connection for charging correlation purposes.

7) After the proxy binding update is successful, the ePDG is authenticated by the UE and indicates to the UE that the authentication and authorization with the external AAA server is successful.

8) The ePDG sends the final IKEv2 message with the IP address in IKEv2 configuration payloads. The ePDG also includes the identity of the associated PDN (APN) in the IDr payload of IKEv2. In case the UE provided APN to the ePDG in the earlier steps, the ePDG shall not change the provided APN.

9) IP connectivity from the UE to the P-GW is now setup. Any packet in the uplink direction is tunnelled to the ePDG by the UE using the IPSec tunnel. The ePDG then tunnels the packet to the P-GW. From the P-GW normal IP-based routing takes place. In the downlink direction, the packet for UE (HoA) arrives at the P-GW. The P-GW tunnels the packet based on the binding cache entry to the ePDG. The ePDG then tunnels the packet to the UE via proper IPsec tunnel.

A service provider cost reduction policy based on a user subscription type is described. A user may use a voice service on an hourly rate or without limitation according to a pricing model. Similarly, the user may use a messaging service such as a short message service (SMS) or multimedia message service (MMS) based on the number of messages or without limitation according to a pricing model. If a user who has subscribed to a pricing model for unlimited use attempts to use the voice and messaging service, it is more economical for a communication service provider to provide the corresponding service through the Wi-Fi system. Also, the communication service provider may offer a pricing model utilizing the Wi-Fi system to the users who have subscribed to usage-based pricing model, namely, pricing in proportion to hours of use or the number of uses. For example, if the hours of use or the number of uses by the user exceeds a predetermined limit according to a specific pricing model, the communication service provider may provide the corresponding service through the Wi-Fi system.

Figure 9:
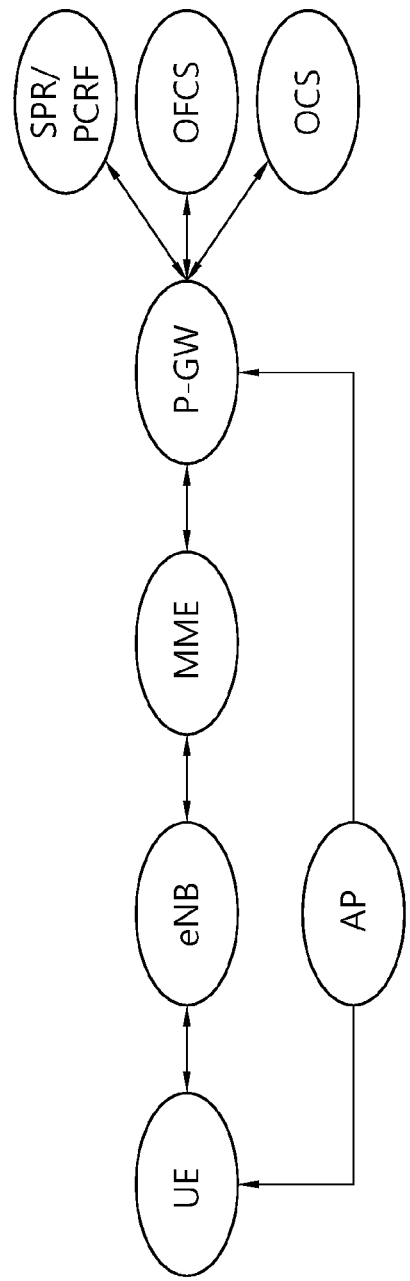
FIG. 9 shows an example of a service provider cost reduction policy using user subscription information.

FIG. 9 shows an example of a service provider cost reduction policy using user subscription information. A communication service provider may manage user subscription information by using a subscriber profile repository (SPR), offline charging system (OFCS), online charging system (OCS), etc. The SPR may manage information such as allowed services and allowed QoS. The OFCS may manage information such as accounting data (the amount of traffic, connection time, etc) for each UE. The OCS may manage the remaining usage for each UE. Information for operations required by the communication service provider according to the user subscription information may be delivered to each entity. In other words, the communication service provider may deliver its preferred network type (e.g., LTE system or Wi-Fi system) for each service to each entity such as UE, eNB, and MME. The information for the operations required by the communication service provider according to the user subscription information may be delivered during a PDN connection (bearer) establishment/modification process or U-plane separation request/response process. The delivered information may be used as a criterion by which appropriateness of the U-plane separation is determined.

Hereinafter, a method for establishing a session of the primary RAT system or a session of the secondary RAT system for U-plane switch is described according to embodiments of the present invention. In the following description, it is assumed that the primary RAT system is a 3GPP LTE system and the secondary RAT system is a Wi-Fi system, but the present invention is not limited thereto. In the following description, it is assumed that a mobility IP network protocol is a PMIP, but the present invention is not limited thereto. The present invention may be applied to other protocols, such as a dual stack mobile IP (DSMIP) protocol, GPRS tunneling protocol (GP), etc.

At first, a method for establishing a session of the secondary RAT system, under the control of the primary RAT system, for U-plane switch is described. It is assumed that a data flow session for the same PDN connection already exists in the primary RAT system.

In addition, the present invention may be applied when a newly established PDN connection, or PDN connection under establishment (e.g., RRC connection establishment, attach, UE-requested PDN connectivity) is routed in the primary RAT system. In this case, the entity of the primary RAT system may establish a session for the primary RAT system (e.g., the PDN session between a UE and S-GW/P-GW) and a session for the secondary RAT system in parallel. At this time, the session for the primary RAT system and the session for the secondary RAT system may be established independently or dependently. When the session for the primary RAT system and the session for the secondary RAT system are established independently, a procedure for determining a routing type, which is U-plane switch, may be performed subsequently after the sessions are established. When the session for the primary RAT system and the session for the secondary RAT system are established dependently, the session for the primary RAT system including the determination of the routing type and the session for the secondary RAT system may be established. When the routing type is U-plane switch, the dependent establishment may be preferred to the independent establishment for quick U-plane switch.

There may be four different approaches to implement a method for establishing a data flow session of the Wi-Fi system under the control of the LTE system.

1) A target device to which U-plane switch is to be applied (e.g., UE and multi-RAT device) checks whether it can access the Wi-Fi system (e.g., scanning on the Wi-Fi system), and the LTE system determines whether to establish a Wi-Fi data flow session. After the determination, the LTE system requests the corresponding target device to attach to the Wi-Fi system.

2) Based on a measurement result on the Wi-Fi system reported by the device, the LTE system determines whether to establish a Wi-Fi data flow session. The LTE system requests the target device to which U-plane switch is to be applied to associate with the Wi-Fi system and attach thereto.

3) The device performs association with the Wi-Fi system and attachment thereto. An entity of the LTE system (e.g., HSS, 3GPP AAA, P-GW) which has received the attachment from the corresponding device establishes a Wi-Fi data flow session.

4) The device performs association with the Wi-Fi system and attachment thereto. An entity of the LTE system (e.g., HSS, 3GPP AAA, P-GW) which has received the attachment from the corresponding device determines whether to apply U-plane switch and establishes a Wi-Fi data flow session.

Hereinafter, each method is described with reference to a specific embodiment of the present invention.

(1) Method 1

Figure 10:
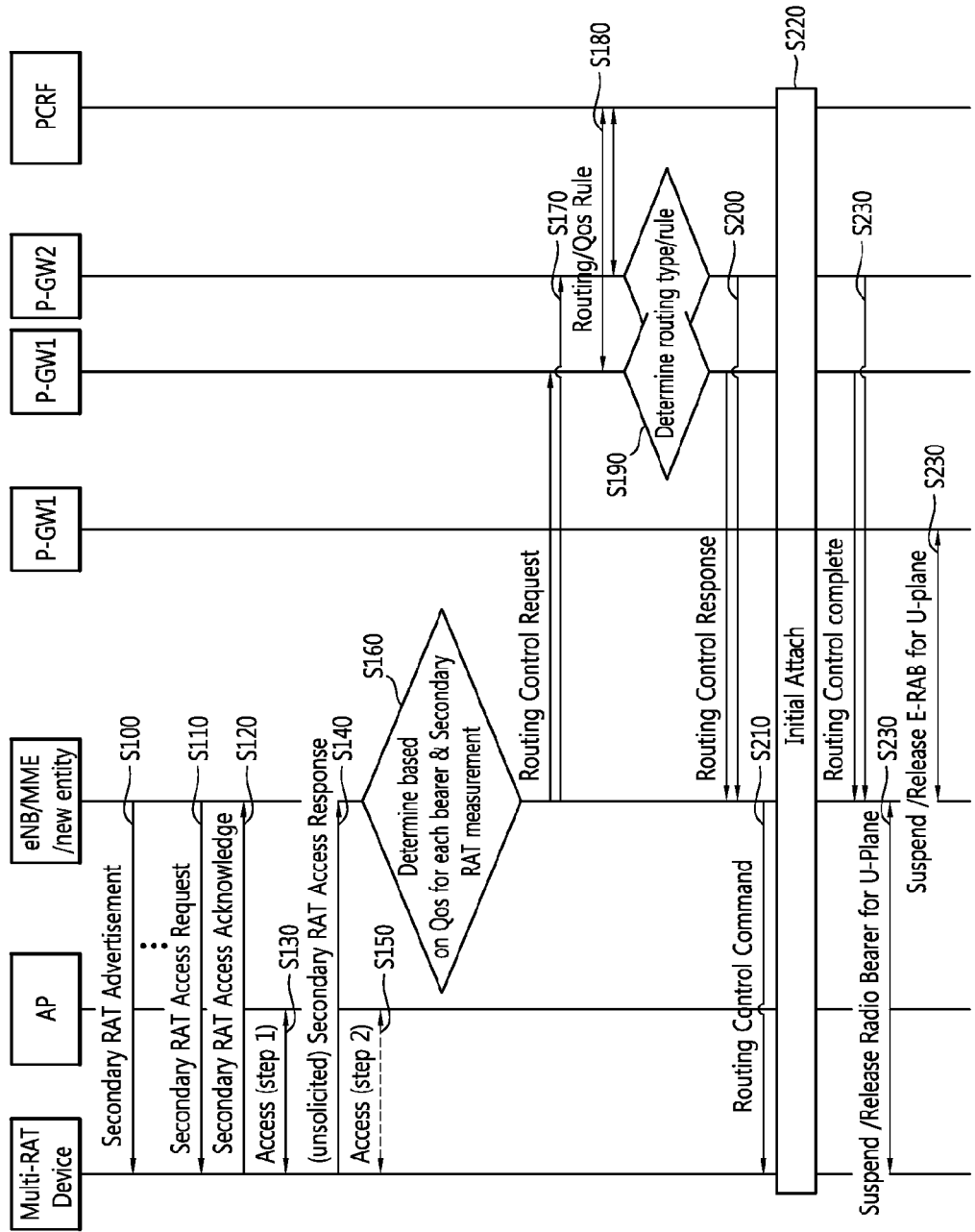
FIG. 10 shows an example of a method for establishing a session of a Wi-Fi system according to an embodiment of the present invention.

FIG. 10 shows an example of a method for establishing a session of a Wi-Fi system according to an embodiment of the present invention.

In step S100, an entity of the LTE system such as an eNB, MME, and new entity may transmit a secondary RAT advertisement message to a multi-RAT device. The secondary RAT advertisement message may include information related to the Wi-Fi system such as an AP list, access request indicator, and access type.

The AP list carries information of APs within coverage of a serving eNB to which multi-RAT devices belong. Information of an AP includes MAC address of the AP (BSSID), SSID of the AP, homogeneous ESS ID (HESSID) of the AP, and information about a radio channel used by the AP (operating class, channel number, etc). The access request indicator indicates whether an operation according to the access type has been requested. The access type indicates a step among scanning, pre-association, and association step, up to which the multi-RAT device has to perform to connect to the Wi-Fi system. In other words, the access type may be any one of the scanning, pre-association, and association. Whether to incorporate the access type into the secondary RAT advertisement message may be determined according to the value of the access request indicator.

Or, in step S110, the entity of the LTE system may transmit a secondary RAT access request message to the multi-RAT device. The secondary RAT access request message may include an AP list and access type. The AP list and access type included in the secondary RAT access request message are the same as the AP list and access type included in the second RAT advertisement message described in step S100.

In step S120, the multi-RAT device transmits a secondary RAT access acknowledge message to the entity of the LTE system as a response to the received secondary RAT advertisement message or the received secondary RAT access request message.

In step S130, the multi-RAT device and AP perform access according to the access type. In step S140, the multi-RAT device transmits a (unsolicited) secondary RAT access response message to the entity of the LTE system. The (unsolicited) secondary RAT access response message may include an accessible AP list from among acquired APs and measurement results on the corresponding APs. In step S150, since some steps for connecting to the Wi-Fi system may not be performed depending on the access type, the multi-RAT device and a specific AP may perform access.

In step S160, the entity of the LTE system determines that which routing type (e.g., U-plane aggregation, U-plane segregation, U-plane switch) is appropriate. The entity of the LTE system may determine based on QoS of flow of each bearer or all of bearers in each PDN possessed by the multi-RAT device, measurement results on the Wi-Fi system and/or LTE system reported by the multi-RAT device, and air/network load of each RAT system. The QoS may include a quality class identifier (QCI), allocation and retention priority (ARP), bit rate or traffic per bearer, and bit rates of traffic per group of bearers. The routing type may be determined as U-plane switch when load situation of the LTE system is bad whereas load situation of the Wi-Fi system is good, and when all of bearers of the corresponding multi-RAT device has non-real time characteristic.

The entity of the LTE system may determine a routing rule according to determined routing type. If the routing type is the U-plane aggregation, the routing rule may indicate a transmission ratio through each RAT system. If the routing type is the U-plane segregation, the routing rule may indicate a transmission RAT system. If the routing type is the U-plane switch, the routing rule may indicate a switch RAT system, i.e., Wi-Fi system.

In step S170, the entity of the LTE system transmits a routing control request message to one or more P-GW corresponding to all of the PDN possessed by the multi-RAT device, according to the routing type determined in step of S160, which is U-plane switch. The routing control request message may include the routing type, which is U-plane switch, and the routing rule, which is a switch RAT system, i.e., Wi-Fi system. Also, the routing control request message may include routing rules for other routing types, i.e., U-plane aggregation and U-plane segregation, which may be used for the P-GW to finally determine one routing type/rule. In step S180, the P-GW acquires routing type/rule about the corresponding bearer or flow from the PCRF.

In step S190, based on the routing type/rule acquired from the entity of the LTE system or PCRF, or both, the P-GW determines the routing type/rule and determines whether to apply U-plane switch, from the LTE system to the Wi-Fi system, to the corresponding bearer.

In step S200, the P-GW transmits a routing control response message to the entity of the LTE system. The routing control response message may include a result (acceptance/rejection) as a response to a request of the entity of the LTE system, the routing type to be applied, i.e., U-plane switch, and the routing rule to be applied, i.e., Wi-Fi system.

In step S210, the entity of the LTE system transmits a routing control command message to the multi-RAT device. First, if the request of the entity of the LTE system is accepted, the entity of the LTE system temporarily stores information for U-plane switch of the multi-RAT device. For example, the information for U-plane switch may be stored temporarily in an HSS. If the request of the entity of the LTE system is accepted, the routing control command message may include the routing type to be applied, i.e., U-plane switch, the routing rule to be applied, i.e., Wi-Fi system, and security information. The security information is for processing 3GPP AAA authentication procedures quickly. In addition, the multi-RAT device may stop UL data transmission.

If the request of the entity of the LTE system is rejected, the entity of the LTE system may command the multi-RAT device to perform an operation for the Wi-Fi system. In this case, the operation may include disassociation, suspension of scanning, and turning off of RF unit.

In step S220, an initial attachment is performed. Procedures such as the initial attachment procedure over PMIP based S2b described in FIG. 8 may be used. In step S230, the P-GW transmits a routing control complete message to the entity of the LTE system.

In step S240, the entity of the LTE system suspends (or deactivates) and releases radio bearers mapped to all of evolved packet system (EPS) bearer related to U-plane. The existing procedures of the LTE system for radio bearer release may be used. If the multi-RAT device is to be maintained in RRC connected state, an RRC connection reconfiguration message may be used. If the multi-RAT device is to be switched to RRC idle state, an RRC connection release message may be used. In this case, the eNB transmits the RRC connection release message after receiving an UE context release command message. A release cause may be defined as U-plane switch. Upon receiving the corresponding RRC message, the multi-RAT device stops UL data transmission.

In step S250, after all UL data is transmitted to the P-GW, the entity of the LTE system suspends (or deactivates) and releases E-UTRAN radio access bearers (E-RABs) mapped to the corresponding EPS bearer. The existing procedures of the LTE system for release may be used. If the multi-RAT device is to be maintained in RRC connected state, an E-RAB release command message or E-RAB release indication message may be used. If the multi-RAT device is to be switched to RRC idle state, a UE context release request message or UE context release command message may be used. Between the MME and S-GW, a release access bearer request/response messages may be used.

As a result, DL data may be transmitted through the session of the Wi-Fi system after step S230, and UL data may be transmitted through the session of the Wi-Fi system after step S240.

(2) Method 2

Figure 11:
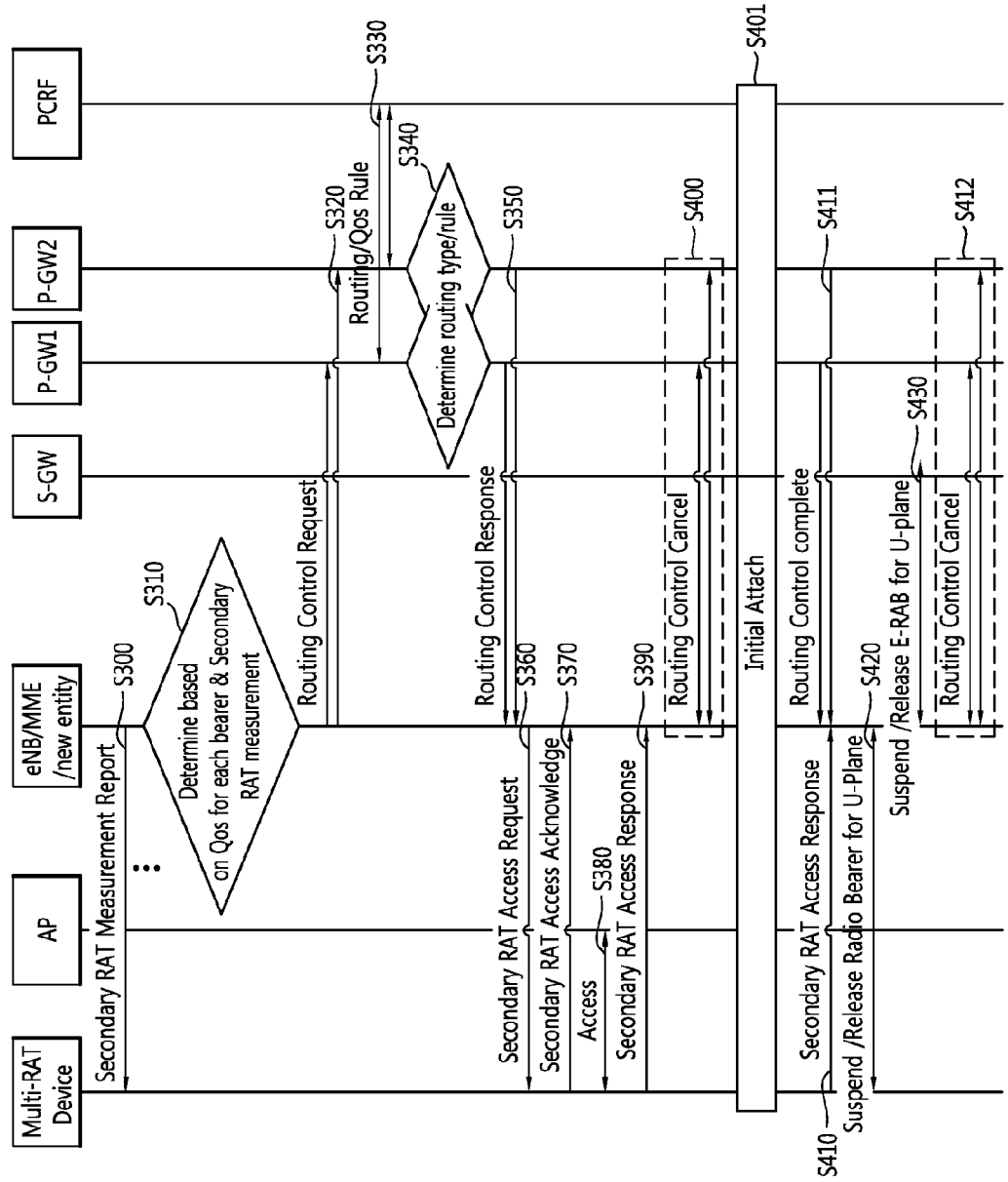
FIG. 11 shows an example of a method for establishing a session of a Wi-Fi system according to another embodiment of the present invention.

FIG. 11 shows an example of a method for establishing a session of a Wi-Fi system according to another embodiment of the present invention.

In step S300, the multi-RAT device transmits a secondary RAT measurement report message to the entity of the LTE system such as an eNB, MME, and new entity. The secondary RAT access measurement report message may include an accessible AP list and measurement results on the corresponding APs.

Step S310 to S350 of FIG. 11 are the same respectively as step S160 to S200 of FIG. 10. Therefore, descriptions are omitted.

In step S360, the entity of the LTE system transmits a secondary RAT access request message to the multi-RAT device. First, if the request of the entity of the LTE system is accepted, the entity of the LTE system temporarily stores information for U-plane switch of the multi-RAT device. If the request of the entity of the LTE system is accepted, the entity of the LTE system requests the multi-RAT device to perform the operation according to the access type (i.e., 3GPP attachment) and delivers the information for U-plane switch to the multi-RAT device. The secondary RAT access request message may include an AP list, access type, routing control command flag, the routing type to be applied, i.e., U-plane switch, the routing rule to be applied, i.e., Wi-Fi system, and security information.

The AP list carries information of APs within coverage a serving eNB to which multi-RAT devices belong. Information of an AP includes MAC address of the AP (BSSID), SSID of the AP, homogeneous ESS ID (HESSID) of the AP, and information about a radio channel used by the AP (operating class, channel number, etc). The secondary RAT request message includes only the information of APs having large signal strength based on the measurement results of the multi-RAT device.

The access type indicates a step among scanning, pre-association, association step, and 3GPP attachment, up to which the multi-RAT device has to perform to connect to the Wi-Fi system. In other words, the access type may be any one of the scanning, pre-association, association, and 3GPP attachment. The routing control command flag indicates inclusion instruction of routing and related information.

In step S370, the multi-RAT device transmits a secondary RAT access acknowledge message to the entity of the LTE system as a response to the received secondary RAT access request message. In step S380, the multi-RAT device and AP perform access according to the access type. In step S390, the multi-RAT device may transmit a secondary RAT access response message to the entity of the LTE system. The secondary RAT access response message may include a result, type, and associated AP.

If the result included in the second RAT access response message is failure, in step S400, the entity of the LTE system transmits a routing control cancel message to the corresponding P-GW. Accordingly, the routing control requested in step S320 may be cancelled. Upon receiving the routing control cancel message, The P-GW cancels application of a new routing rule. The entity of the LTE system deletes the information for U-plane switch stored temporarily in step S360. If the result included in the secondary RAT access response message is success, in step S401, an initial attachment is performed. Procedures such as the initial attachment procedure over PMIP based S2b described in FIG. 8 may be used.

Also, in step S410, the multi-RAT device may transmit a secondary RAT access response message to the entity of the LTE system. Accordingly, the multi-RAT device may report to the entity of the LTE system about results of 3GPP attachment from among operations according to the access type. The secondary RAT access response message may include a result, type, and associated AP. The result indicates a result according to the access type (success/failure). The type may be 3GPP attachment. The associated AP may be included when the result is success and the type is the association. Meanwhile, if the result is success and the routing rule indicates the Wi-Fi system, the multi-RAT device may stop UL data transmission.

If the result included in the secondary RAT access response message is success, in step S411, the P-GW perceives that the multi-RAT device to which U-plane switch is to be applied has been attached and applies a determined routing type/rule. The P-GW transmits a routing control complete message to the entity of the LTE system. If the result included in the secondary RAT access response message is failure, in step S412, the entity of the LTE system transmits a routing control cancel message to the corresponding P-GW. Accordingly, the routing control requested in step S320 may be cancelled. Upon receiving the routing control cancel message, The P-GW cancels application of a new routing rule. The entity of the LTE system deletes the information for U-plane switch stored temporarily in step S360.

If the result included in the secondary RAT access response message is success, in step S420, the entity of the LTE system suspends (or deactivates) and releases radio bearers mapped to all of EPS bearer related to U-plane. If the result included in the secondary RAT access response message is success, in step S430, after all UL data is transmitted to the P-GW, the entity of the LTE system suspends (or deactivates) and releases E-RABs mapped to the corresponding EPS bearer.

As a result, DL data may be transmitted through the session of the Wi-Fi system after step S411, and UL data may be transmitted through the session of the Wi-Fi system after step S420.

(3) Method 3

Figure 12:
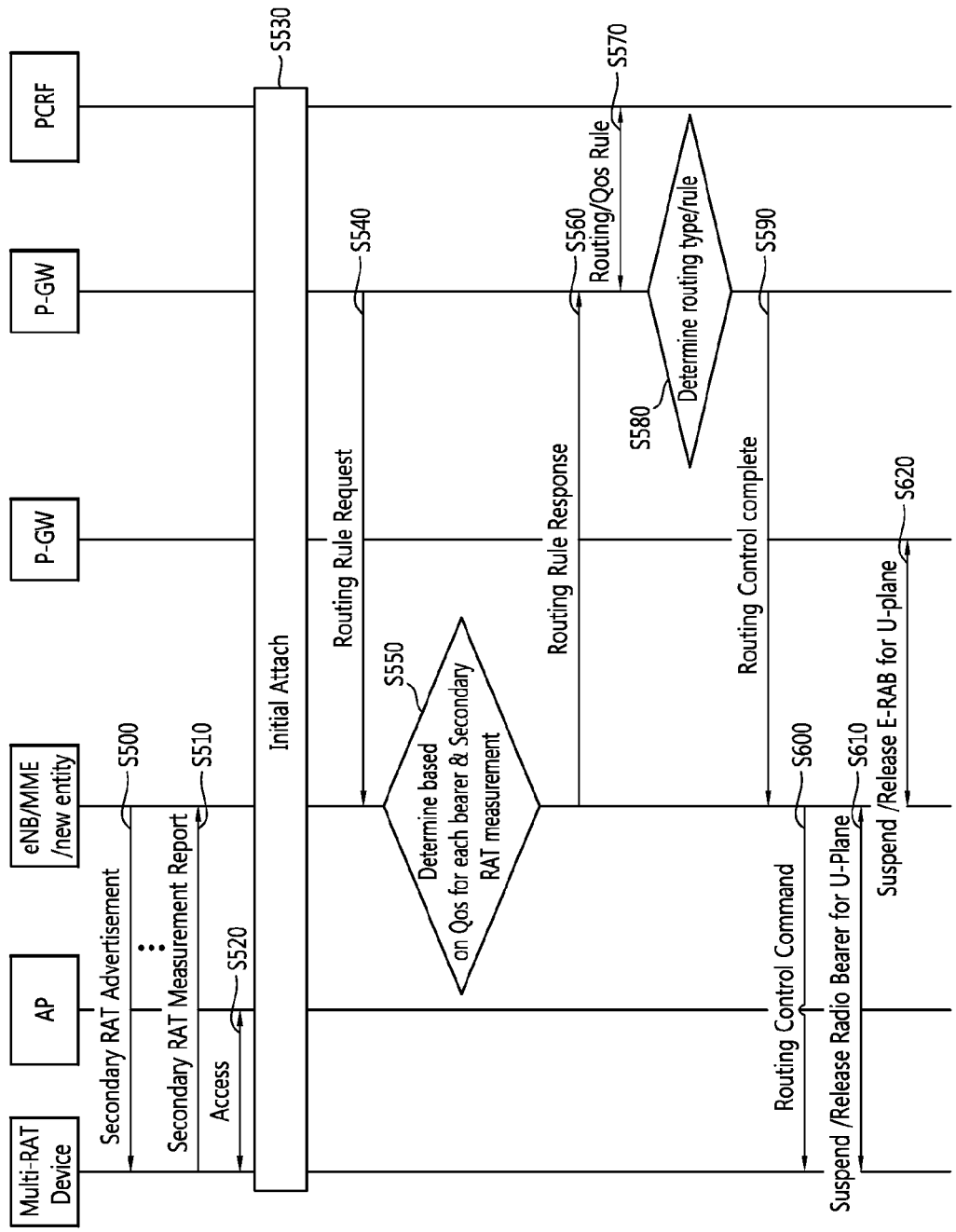
FIG. 12 shows an example of a method for establishing a session of a Wi-Fi system according to another embodiment of the present invention.

FIG. 12 shows an example of a method for establishing a session of a Wi-Fi system according to another embodiment of the present invention.

In step S500, the entity of the LTE system such as an eNB, MME, or new entity may transmit a secondary RAT advertisement message to the multi-RAT device. The secondary RAT advertisement message may include an AP list, access request indicator, and access type.

In step S510, the multi-RAT device may transmit a secondary RAT measurement report message to the entity of the LTE system. The secondary RAT access measurement report message may include an accessible AP list and measurement results on the corresponding APs.

In step S520, the multi-RAT device performs access to an AP. In step S530, an initial attachment is performed. Procedures such as the initial attachment procedure over PMIP based S2b described in FIG. 8 may be used.

In step S540, the P-GW transmits a routing rule request message to the entity of the LTE system. Step S550 is the same as step S160 of FIG. 10. Therefore, description is omitted. In step S560, the entity of the LTE system transmits a routing rule response message to the P-GW. Specific operation is the same as in step S170 of FIG. 10. Step S570 and S580 are the same respectively as step S180 and S190 of FIG. 10. Therefore, descriptions are omitted. In step S590, the P-GW transmits a routing control complete message to the entity of the LTE system. Specific operation is the same as in step S200 of FIG. 10.

In step S600, the entity of the LTE system transmits a routing control command message to the multi-RAT device. The entity of the LTE system temporarily stores information for U-plane switch of the multi-RAT device. The routing control command message may include the routing type to be applied, i.e., U-plane switch, the routing rule to be applied, i.e., Wi-Fi system, and security information. The security information is for processing 3GPP AAA authentication procedures quickly. In addition, the multi-RAT device may stop UL data transmission.

In step S610, the entity of the LTE system suspends (or deactivates) and releases radio bearers mapped to all of EPS bearer related to U-plane. Step S610 may be performed by being combined with step S600. The entity of the LTE system may notify the multi-RAT device of an action code for the RRC connection as well as the information for U-plane switch. The action code for the RRC connection may indicate whether only data radio bearers are suspended and released or signaling radio bearers as well as the data radio bearers are suspended and released. According to the action code for the RRC connection, the entity of the LTE system may use the existing procedures of the LTE system for radio bearer release. If the action code for the RRC connection indicates that only the data radio bearers are suspended and released, an RRC connection reconfiguration message may be used. If the action code for the RRC connection indicates that the signaling radio bearers as well as the data radio bearers are suspended and released, an RRC connection release message may be used. In this case, the RRC connection reconfiguration message and RRC connection release message should include the information for U-plane switch.

In step S620, after all UL data is transmitted to the P-GW, the entity of the LTE system suspends (or deactivates) and releases E-RABs mapped to the corresponding EPS bearer.

As a result, DL data may be transmitted through the session of the Wi-Fi system after step S590, and UL data may be transmitted through the session of the Wi-Fi system after step S610.

(4) Method 4

Figure 13:
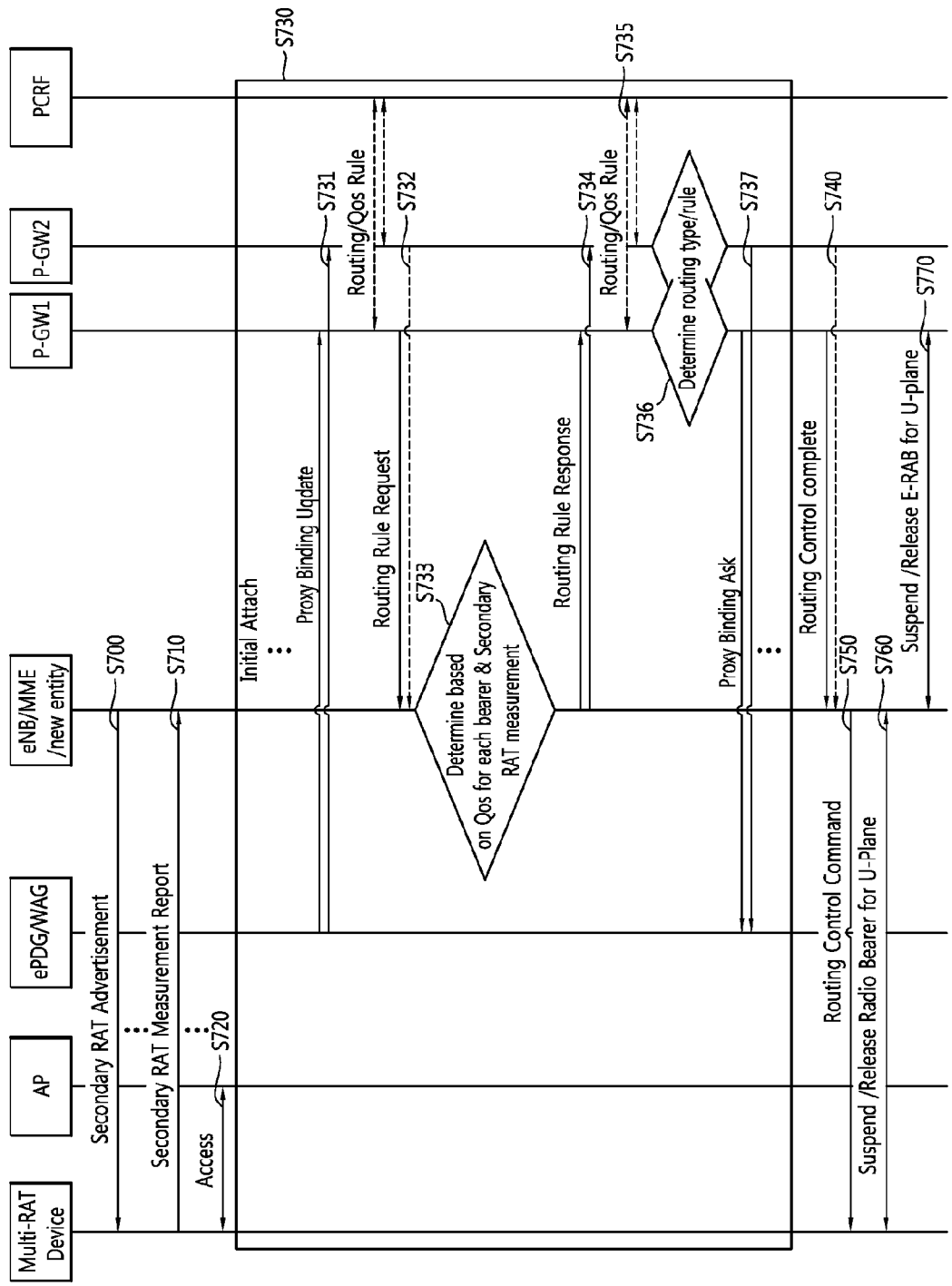
FIG. 13 shows an example of a method for establishing a session of a Wi-Fi system according to another embodiment of the present invention.

FIG. 13 shows an example of a method for establishing a session of a Wi-Fi system according to another embodiment of the present invention.

Step S700 to S720 are the same respectively as step S500 to S520 of FIG. 12. Therefore, descriptions are omitted.

In step S730, an initial attachment is performed. In detail, in step S731, the ePDG or WAG transmits a proxy binding update message to the P-GW. Step S732 to S736 are the same respectively as step S540 to S580 of FIG. 12. Therefore, descriptions are omitted. In step S737, the P-GW transmits a proxy binding acknowledge message to the ePDG or WAG.

Step S740 to S770 are the same respectively as step S590 to S620 of FIG. 12. Therefore, descriptions are omitted.

As a result, DL data may be transmitted through the session of the Wi-Fi system after step S740, and UL data may be transmitted through the session of the Wi-Fi system after step S760.

Hereinafter, a method for establishing a session of the primary RAT system, under the control of the primary RAT system, for U-plane switch is described. It is assumed that a data flow session for the same PDN connection already exists in the secondary RAT system. According to the present invention, for U-plane switch through a plurality of RAT systems, a data flow session for the same PDN connection is established in the primary RAT system under the control of the primary RAT system.

Figure 14:
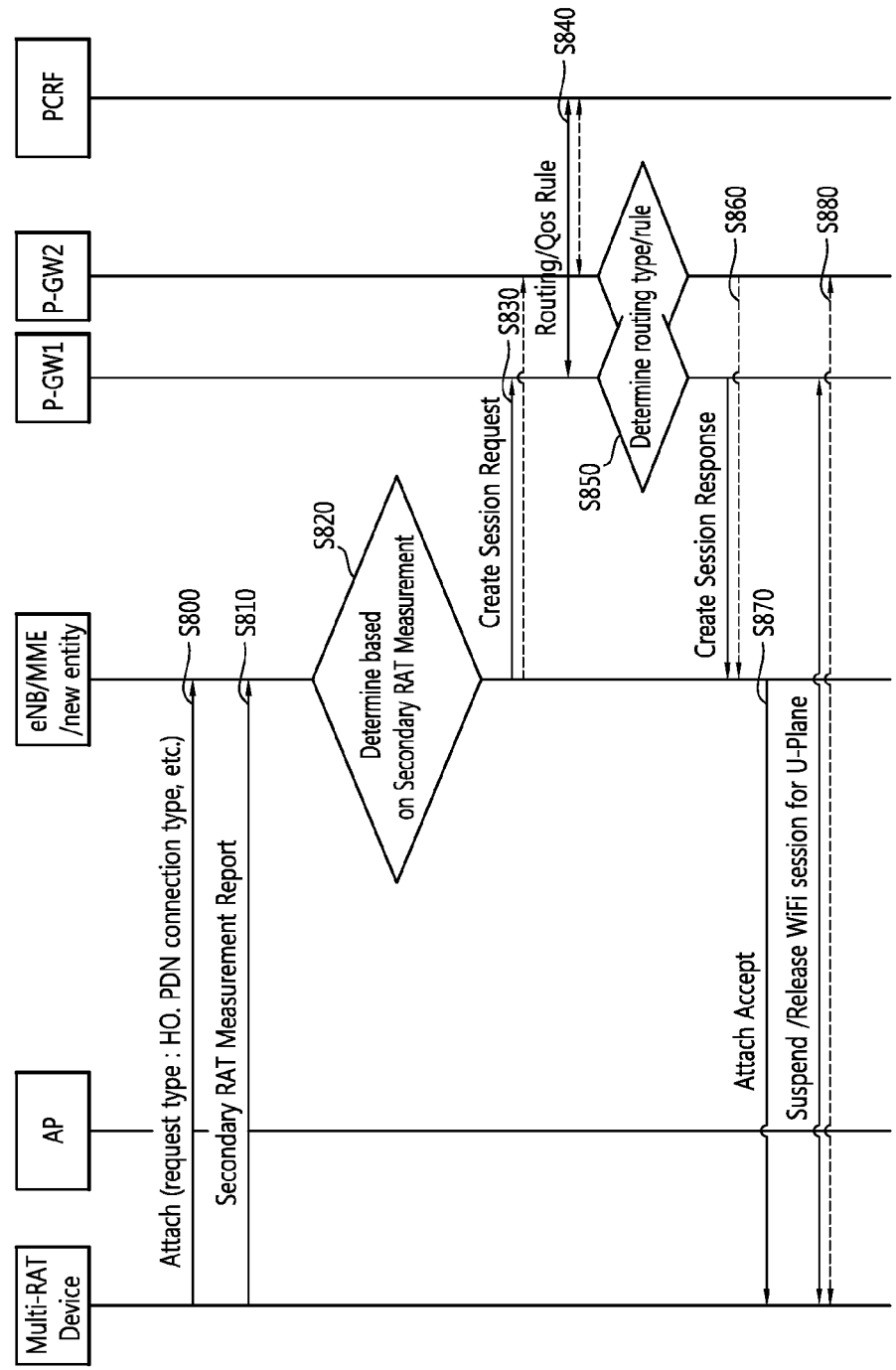
FIG. 14 shows an example of a method for establishing a session of a LTE system by a trigger of a general device according to an embodiment of the present invention.

FIG. 14 shows an example of a method for establishing a session of a LTE system by a trigger of a general device according to an embodiment of the present invention. The embodiment described in FIG. 14 may be applied to a general device whose status is in evolved packet system (EPS) mobility management (EMM)-Deregistered+EPS connection management (ECM)-Idle+RRC-Idle.

In step S800, the multi-RAT device performs attach procedure with the entity of the LTE system such as an eNB, MME, and new entity. At this time, a request type which is set to handover (HO), and PDN connection HO type may be delivered together.

In step S810, the multi-RAT device transmits a secondary RAT measurement report message to an entity of the LTE system. The secondary RAT measurement report message may include associated APs and a measurement result on the associated APs.

If the value of the PDN connection HO type within the message received in step S800 is 0b00, the entity of the LTE system establishes a session with an S-GW or P-GW and releases the session of the Wi-Fi system. However, if the entity of the LTE system determines that U-plane switch is not appropriate, the entity of the LTE system may perform a conventional session establishment procedure or may perform the same procedure as a procedure performed when the value of the PDN connection HO type within the message received in step S800 is 0b11.

If the value of the PDN connection HO type within the message received in step S800 is one of 0b01, 0b10 and 0b11, or if the entity of the LTE system receives the secondary RAT measurement report message in step S810, in step S820, the entity of the LTE system determines that which routing type (e.g., U-plane aggregation, U-plane segregation, U-plane switch) is appropriate based on measurement results on the Wi-Fi system and/or LTE system reported by the multi-RAT device, and air/network load of each RAT system. The entity of the LTE system may determine a routing rule according to determined routing type. If the routing type is the U-plane aggregation, the routing rule may indicate a transmission ratio through each RAT system. If the routing type is the U-plane segregation, the routing rule may indicate a transmission RAT system. If the routing type is the U-plane switch, the routing rule may indicate a switch RAT system, i.e., LTE system.

In step S830, the entity of the LTE system transmits a create session request message to the corresponding P-GW. The create session request message may include the routing type, which is U-plane switch, and the routing rule, which is a switch RAT system, i.e., LTE system. In step S840, the P-GW acquires routing type/rule from the PCRF.

In step S850, based on the routing type/rule acquired from the entity of the LTE system or PCRF, or both, each P-GW determines the routing type/rule and determines whether to apply U-plane switch, from the Wi-Fi system to the LTE system, to the corresponding bearer.

In step S860, the P-GW applies the determined routing type/rule and notifies the entity of the LTE system of the application by transmitting a create session response message to the entity of the LTE system. In addition, the P-GW may stop DL data transmission through the session of the Wi-Fi system. The create session response message may include information for U-plane switch, such as a result (acceptance/rejection) as a response to a request of the entity of the LTE system, the routing type to be applied, i.e., U-plane switch, and the routing rule to be applied, i.e., LTE system. If the create session response message does not include the information for U-plane switch, it may indicate that U-plane switch is not applied to the created EPS bearer.

In step S870, if the create session response message includes the information for U-plane switch, the entity of the LTE system stores the information for U-plane switch of the multi-RAT device in the HSS, for example. And the entity of the LTE system transmits information for U-plane switch to the multi-RAT device through an attach accept message or RRC connection reconfiguration message. If the create session response message does not include the information for U-plane switch, the entity of the LTE system may transmit the existing attach accept message to the multi-RAT device. Upon receiving the information for U-plane switch, the multi-RAT device may perform the operation (data transmission) according to the corresponding routing type/rule. Also, the multi-RAT device may stop UL data transmission through the session of the Wi-Fi system.

The multi-RAT device may resume UL data transmission through the session of the LTE system after the RRC connection reconfiguration procedure is completed. The multi-RAT device may resume DL data transmission through the session of the LTE system after the attach procedure is completed and modify bearer request/response messages are exchanged.

In step S880, the P-GW or the entity of the LTE system suspends (or deactivates) and releases sessions of the Wi-Fi system mapped to all of EPS bearer related to U-plane.

Figure 15:
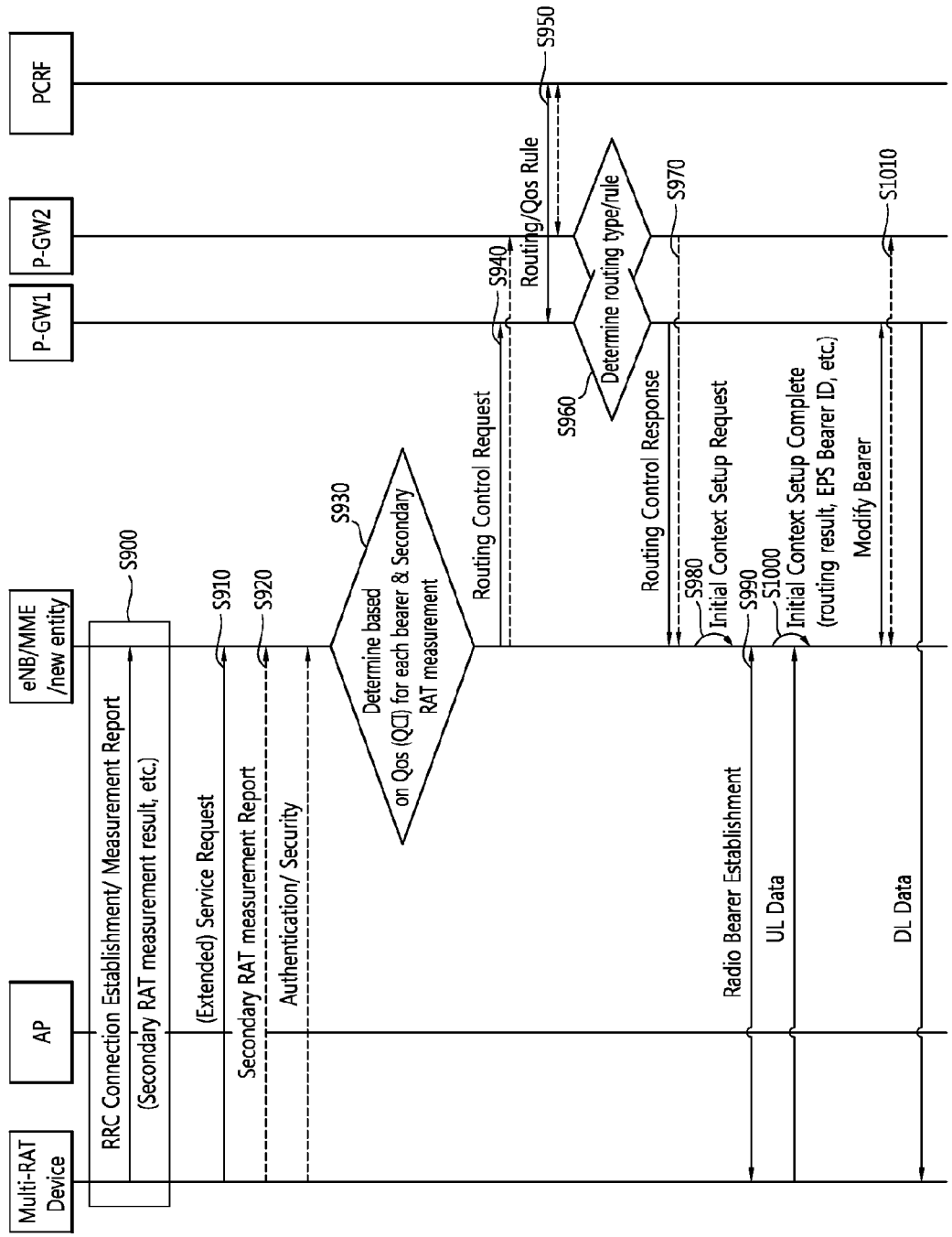
FIG. 15 shows an example of a method for establishing a session of a LTE system by a trigger of a general device according to another embodiment of the present invention.

FIG. 15 shows an example of a method for establishing a session of a LTE system by a trigger of a general device according to another embodiment of the present invention. The embodiment described in FIG. 15 may be applied to a general device whose status is in EMM-Registered+ECM-Idle+RRC-Idle.

In step S600, the multi-RAT device may transmit a RRC connection establishment message and measurement report message to the entity of the LTE system such as an eNB, MME, and new entity.

In step S910, the multi-RAT device transmits a (extended) service request message to the entity of the LTE system. Accordingly, the multi-RAT device may request the entity of the LTE system to perform handover of all of data flows transmitted and received through the Wi-Fi system.

The service request message may include service type of data flows in the Wi-Fi system and bearer information. The service type and bearer information may be transmitted by using the following methods.

1) The service type and bearer information may be transmitted by using reserved values of a service type field in the service request message.

Table 2 represents the service type field of the existing service request message.

TABLE 2

| Bit 4 | Bit 3 | Bit 2 | Bit 1 | Description |
|---|---|---|---|---|
| 0 | 0 | 0 | 0 | mobile originating CS fallback or 1xCS fallback |
| 0 | 0 | 0 | 1 | mobile terminating CS fallback or 1xCS fallback |
| 0 | 0 | 1 | 0 | mobile originating CS fallback emergency call or 1xCS fallback emergency call |
| 0 | 0 | 1 | 1 | unused; shall be interpreted as "mobile originating CS fallback or 1xCS fallback", if received by the network |
| 0 | 1 | 0 | 0 | unused; shall be interpreted as "mobile originating CS fallback or 1xCS fallback", if received by the network |
| 1 | 0 | 0 | 0 | packet services via S1 |
| 1 | 0 | 0 | 1 | unused; shall be interpreted as "packet services via S1", if received by the network |
| 1 | 0 | 1 | 0 | unused; shall be interpreted as "packet services via S1", if received by the network |
| 1 | 0 | 1 | 1 | unused; shall be interpreted as "packet services via S1", if received by the network |

The service type and bearer information may be transmitted by using reserved values not shown in Table 2. For example, reserved values may be used as follows.

0b1100: Handover for all PDN connection (U-plane switch)

0b1101: Bandwidth/U-plane aggregation for the specific PDN connection

0b1110: Bandwidth/U-plane segregation for the specific PDN connection

0b1111: Handover with no preference/decision by network→this value may be replaced with the existing packets services via S1.

Among the reserved values described above, the value of 0b1100 indicates U-plane switch.

2) The service type and bearer information may be transmitted by using the EPS bearer context status field of the service request message.

The multi-RAT device may set all of bits of the EPS bearer context status field to 1, which correspond to all of EPS bearers transmitted and received through a current Wi-Fi system. At this time, each bit is mapped to each EPS bearer ID. Table 3 shows an example of EPS bearer context status field of the service request message.

TABLE 3

| 8 | 7 | 6 | 5 | 4 | 3 | 2 | 1 |
|---|---|---|---|---|---|---|---|
| EPS bearer context status IEI | | | | | | | |
| Length of EPS bearer context status contents | | | | | | | |
| EBI (7) | EBI (6) | EBI (5) | EBI (4) | EBI (3) | EBI (2) | EBI (1) | EBI (0) |
| EBI (15) | EBI (14) | EBI (13) | EBI (12) | EBI (11) | EBI (10) | EBI (9) | EBI (8) |

3) The service type and bearer information may be transmitted by being included as a form of a field within an RRC connection establishment message, or a value for the corresponding purpose may be newly defined within the existing establishment cause.

Step S920 and S930 are the same respectively as step S810 and S820 of FIG. 14. Therefore, descriptions are omitted. In step S940, the entity of the LTE system transmits a routing control request message to the P-GW. Specific operation is the same as in step S830 of FIG. 14. Step S950 and S960 are the same respectively as step S840 and S850 of FIG. 14.

In step S970, the P-GW applies the determined routing type/rule and notifies the entity of the LTE system of the application by transmitting a routing control response message to the entity of the LTE system. In addition, the P-GW may stop DL data transmission through the session of the Wi-Fi system. The create session response message may include information for U-plane switch, such as a result (acceptance/rejection) as a response to a request of the entity of the LTE system, the routing type to be applied, i.e., U-plane switch, and the routing rule to be applied, i.e., LTE system.

In step S980, if the result included in the routing control response message is "accept", the entity of the LTE system stores information for U-plane switch of the multi-RAT device to an HSS, for example. And the entity of the LTE system transmits information for U-plane switch to the multi-RAT device. The MME may transmit the information for U-plane switch to the eNB through an existing S1 message such as the initial context setup request message, and the eNB may transmit the information for U-plane switch to the multi-RAT device by using an existing message such as the RRC connection reconfiguration message. If the result included in the routing control response message is "reject", the entity of the LTE system may transmit "service reject" to the multi-RAT device.

Upon receiving the information for U-plane switch, in step S990, the multi-RAT device may perform an operation (UL data transmission) according to the corresponding routing type/rule. Also, the multi-RAT device may stop UL data transmission through the session of the Wi-Fi system. The multi-RAT device may resume UL data transmission through the session of the LTE system after the RRC connection reconfiguration procedure is completed.

In step S1000, the eNB transmits a radio bearer establishment result in association with the multi-RAT device to the MME through an existing S1 message such as the initial context setup request message.

In step S1010, the MME transmits the radio bearer establishment result in association with the multi-RAT device to the P-GW through an existing S1 message such as the modify bearer request message. The P-GW may resume DL data transmission. If radio bearer establishment is successful, the P-GW may resume DL data transmission through the session of the LTE system, and the P-GW or the entity of the LTE system suspends (or deactivates) and releases sessions of the Wi-Fi system mapped to all of EPS bearer related to U-plane. If the radio bearer establishment fails, the P-GW may resume DL data transmission through the session of the Wi-Fi system.

Figure 16:
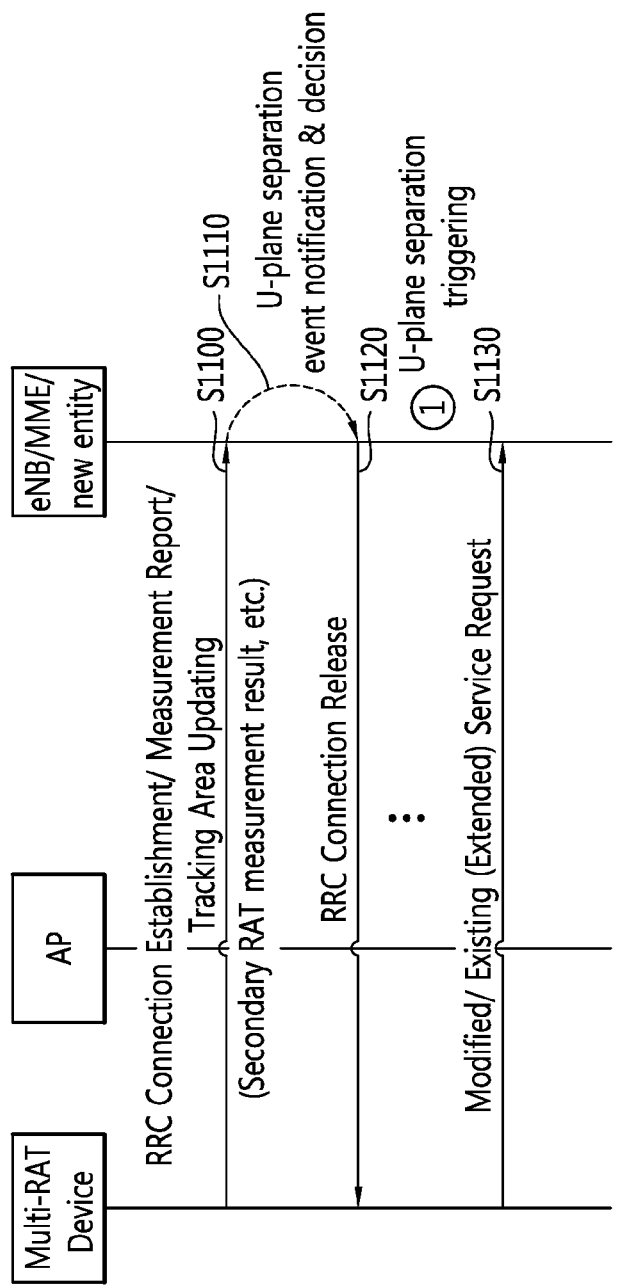
FIG. 16 shows an example of a method for establishing a session of a LTE system by a trigger of a network according to an embodiment of the present invention.

FIG. 16 shows an example of a method for establishing a session of a LTE system by a trigger of a network according to an embodiment of the present invention.

In step S1100, the multi-RAT device transmits the measurement result to the entity of the LTE system such as the eNB, MME, and new entity. In step S1110, if the eNB determines U-plane switch to be appropriate based on the measurement result reported by the multi-RAT device, the eNB informs the MME and new entity about the determination. In step S1120, the eNB transmits the RRC connection release message to the corresponding multi-RAT device. Accordingly, the U-plane switch may be triggered. In step S1130, the multi-RAT device holding a U-plane determined to be appropriate for U-plane switch transmits a modified/existing (extended) service request message to the entity of the LTE system. Upon receiving the modified/existing (extended) service request message, the entity of the LTE system may perform a session establishment procedure to apply U-plane switch. The remaining procedures are the same as the method for establishing a session of the LTE system, by a trigger of a general device, described in FIGS. 14 and 15.

Figure 17:
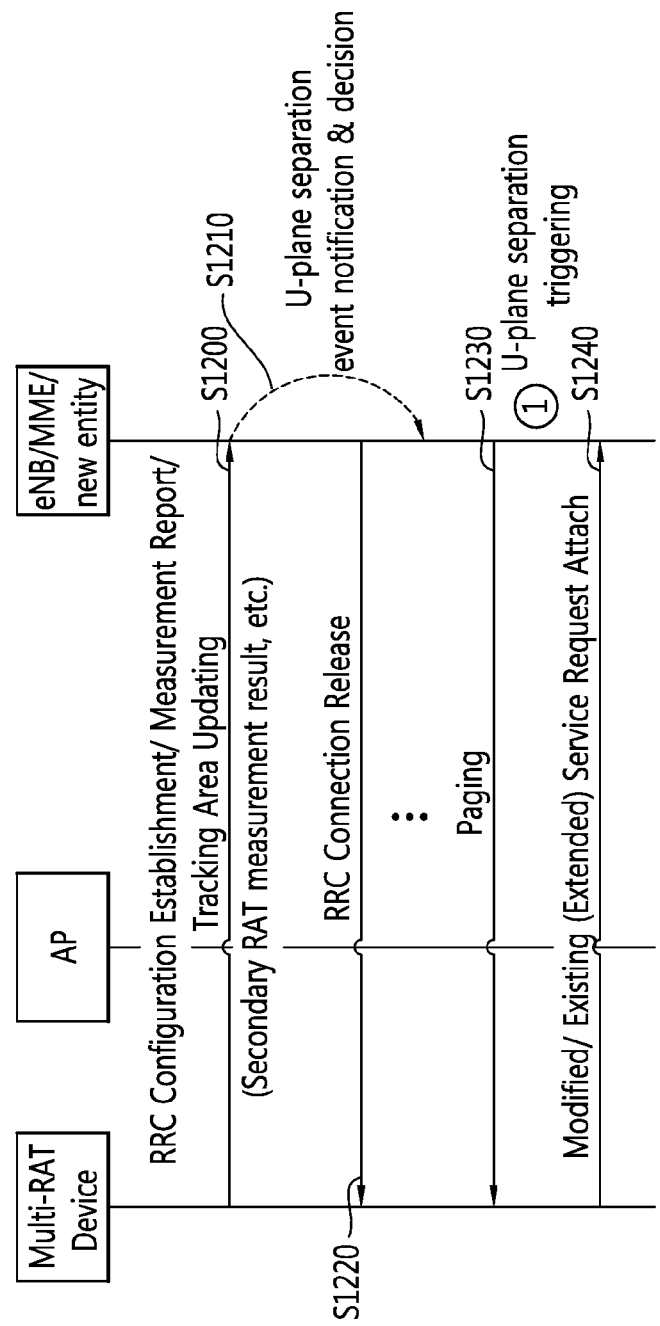
FIG. 17 shows an example of a method for establishing a session of a LTE system by a trigger of a network according to another embodiment of the present invention.

FIG. 17 shows an example of a method for establishing a session of a LTE system by a trigger of a network according to another embodiment of the present invention.

Step S1200 to S1220 are the same respectively as step S1100 to S1120 of FIG. 16. Therefore, descriptions are omitted. In step S1230, if the entity of the LTE system determines U-plane switch to be appropriate, the entity of the LTE system transmits a paging to the multi-RAT device. Accordingly, U-plane switch may be triggered. Step S1240 is the same as step S1130 of FIG. 16. Therefore, description is omitted. The remaining procedures are the same as the method for establishing a session of the LTE system, by a trigger of a general device, described in FIGS. 14 and 15.

Figure 18:
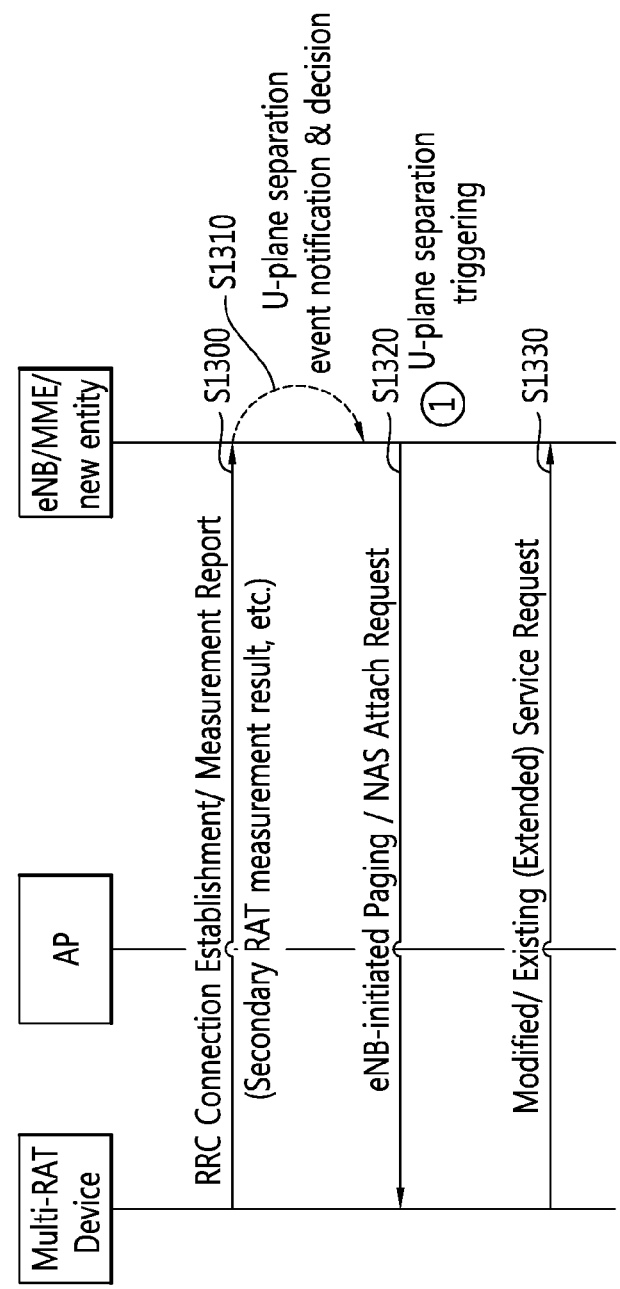
FIG. 18 shows an example of a method for establishing a session of a LTE system by a trigger of a network according to another embodiment of the present invention.

FIG. 18 shows an example of a method for establishing a session of a LTE system by a trigger of a network according to another embodiment of the present invention.

Step S1300 to S1310 are the same respectively as step S1100 to S1110 of FIG. 16. Therefore, descriptions are omitted. In step S1320, if the entity of the LTE system determines U-plane switch to be appropriate, the entity of the LTE system transmits a paging or NAS attach request message to the multi-RAT device. Accordingly, U-plane switch may be triggered. Step S1330 is the same as step S1130 of FIG. 16. Therefore, description is omitted. The remaining procedures are the same as the method for establishing a session of the LTE system, by a trigger of a general device, described in FIGS. 14 and 15.

Figure 19:
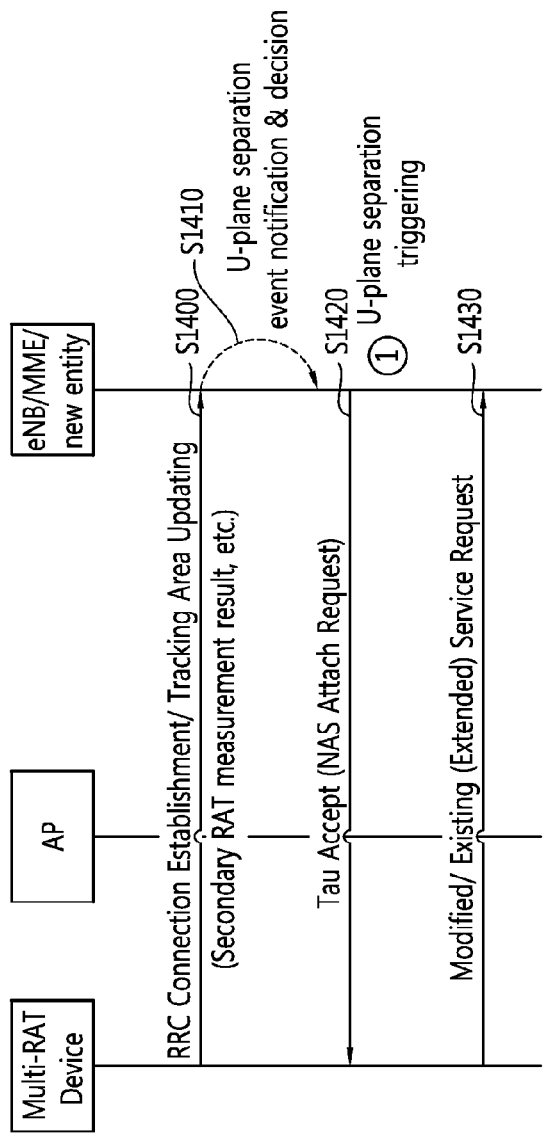
FIG. 19 shows an example of a method for establishing a session of a LTE system by a trigger of a network according to another embodiment of the present invention.

FIG. 19 shows an example of a method for establishing a session of a LTE system by a trigger of a network according to another embodiment of the present invention.

Step S1400 to S1410 are the same respectively as step S1100 to S1110 of FIG. 16. Therefore, descriptions are omitted. In step S1420, the entity of the LTE system may request a NAS attach by transmitting a TAU accept message to the multi-RAT device. Accordingly, U-plane switch may be triggered. Step S1430 is the same as step S1130 of FIG. 16. Therefore, description is omitted. The remaining procedures are the same as the method for establishing a session of the LTE system, by a trigger of a general device, described in FIGS. 14 and 15.

Figure 20:
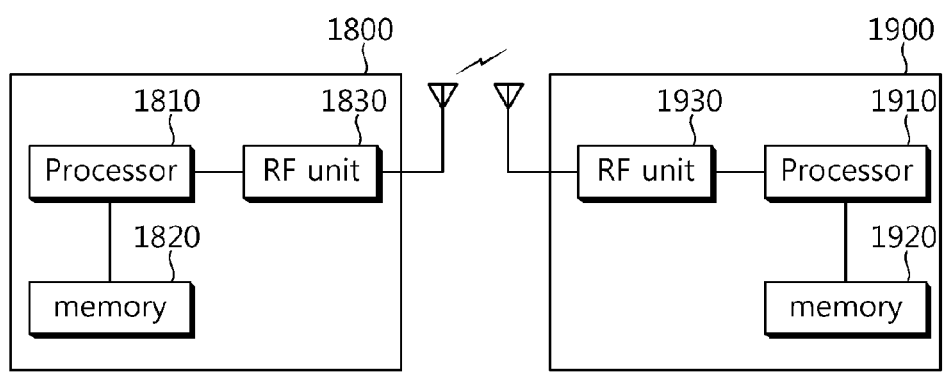
FIG. 20 shows a wireless communication system to implement an embodiment of the present invention.

FIG. 20 shows a wireless communication system to implement an embodiment of the present invention.

An entity of an LTE system 1800 includes a processor 1810, a memory 1820, and a radio frequency (RF) unit 1830. The processor 1810 may be configured to implement proposed functions, procedures, and/or methods in this description. Layers of the radio interface protocol may be implemented in the processor 1810. The memory 1820 is operatively coupled with the processor 1810 and stores a variety of information to operate the processor 1810. The RF unit 1830 is operatively coupled with the processor 1810, and transmits and/or receives a radio signal.

A general device 1900 may include a processor 1910, a memory 1920 and a RF unit 1930. The processor 1910 may be configured to implement proposed functions, procedures and/or methods described in this description. Layers of the radio interface protocol may be implemented in the processor 1910. The memory 1920 is operatively coupled with the processor 1910 and stores a variety of information to operate the processor 1910. The RF unit 1930 is operatively coupled with the processor 1910, and transmits and/or receives a radio signal.

The processors 1810, 1910 may include application-specific integrated circuit (ASIC), other chipset, logic circuit and/or data processing device. The memories 1820, 1920 may include read-only memory (ROM), random access memory (RAM), flash memory, memory card, storage medium and/or other storage device. The RF units 1830, 1930 may include baseband circuitry to process radio frequency signals. When the embodiments are implemented in software, the techniques described herein can be implemented with modules (e.g., procedures, functions, and so on) that perform the functions described herein. The modules can be stored in memories 1820, 1920 and executed by processors 1810, 1910. The memories 1820, 1920 can be implemented within the processors 1810, 1910 or external to the processors 1810, 1910 in which case those can be communicatively coupled to the processors 1810, 1910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for establishing, by an entity of a primary radio access technology (RAT) system, a session in a wireless communication system, the method comprising:
   determining a routing type, which is one of user plane (U-plane) aggregation, U-plane segregation and U-plane switch, and a routing rule according to the routing type, based on quality of service (QoS) for a bearer and measurement results on the primary RAT system and a secondary RAT system;
   when the routing type is the U-plane switch, releasing radio bearers mapped to all evolved packet system (EPS) bearers related to U-plane; and
   after all uplink (UL) data is transmitted to a packet data network (PDN) gateway (P-GW), releasing E-UTRAN radio access bearers (E-RABs) mapped to a corresponding EPS bearer.

2. The method of claim 1, wherein the QoS includes at least one of a quality class identifier (QCI), an allocation and retention priority (ARP), bit rates of traffic per bearer, and bit rates of traffic per group of bearers.

3. The method of claim 1, wherein when the routing type is the U-plane switch, the routing rule indicates a switch RAT system.

4. The method of claim 3, wherein the switch RAT system is the secondary RAT system.

5. The method of claim 1, wherein the routing type is the U-plane switch when a load situation of the primary RAT system is greater than the load situation of the secondary RAT system, and when all of the bearers of the corresponding multi-RAT device have non-real time characteristics.

6. The method of claim 1, further comprising:
   transmitting, to the P-GW, a routing control request message, which includes the routing type as the U-plane switch and the routing rule as a switch RAT system.

7. The method of claim 6, further comprising:
   receiving, from the P-GW as a response to the routing control request message, a routing control response message, which includes a result for the routing control request message, the routing type as the U-plane switch and the routing rule as the switch RAT system.

8. The method of claim 7, further comprising:
   upon receiving the routing control response message, transmitting, to the multi-RAT device, a routing control command message, which includes the routing type as the U-plane switch, the routing rule as the switch RAT system, and security information.

9. The method of claim 1, wherein the entity of the primary RAT system is one of an eNodeB (eNB), a mobility management entity (MME), or a new entity.

10. A method for releasing, by a general device, a session in a wireless communication system, the method comprising:
    receiving, from an entity of a primary RAT system, a routing control command message, which includes a routing type as a user plane (U-plane) switch, a routing rule as a switch radio access technology (RAT) system, and security information; and releasing radio bearers mapped to all evolved packet system (EPS) bearers related to U-plane.

11. The method of claim 10, further comprising:

stopping uplink (UL) data transmission upon receiving the routing control command message.

12. The method of claim 10, further comprising:

stopping UL data transmission upon releasing the radio bearers.

13. The method of claim 10, further comprising:

resuming downlink (DL) data transmission through a session of a secondary RAT system before releasing the radio bearers.

14. The method of claim 10, further comprising:

resuming UL data transmission through a session of a secondary RAT system upon releasing the radio bearers.

* * * * *